(12) United States Patent
Zhamu et al.

(10) Patent No.: US 8,962,188 B2
(45) Date of Patent: Feb. 24, 2015

(54) ANODE COMPOSITIONS FOR LITHIUM SECONDARY BATTERIES

(75) Inventors: Aruna Zhamu, Centerville, OH (US);
Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 778 days.

(21) Appl. No.: 12/655,746

(22) Filed: Jan. 7, 2010

(65) Prior Publication Data
US 2011/0165462 A1    Jul. 7, 2011

(51) Int. Cl.
| | | |
|---|---|---|
| *H01M 4/13* | (2010.01) | |
| *H01M 4/38* | (2006.01) | |
| *H01M 4/134* | (2010.01) | |
| *H01M 4/40* | (2006.01) | |
| *H01M 4/80* | (2006.01) | |
| *H01M 10/052* | (2010.01) | |
| *H01M 12/08* | (2006.01) | |
| *H01M 4/66* | (2006.01) | |
| *H01M 10/0562* | (2010.01) | |

(52) U.S. Cl.
CPC .............. *H01M 4/38* (2013.01); *H01M 4/134* (2013.01); *H01M 4/382* (2013.01); *H01M 4/40* (2013.01); *H01M 4/405* (2013.01); *H01M 4/661* (2013.01); *H01M 4/663* (2013.01); *H01M 4/80* (2013.01); *H01M 4/806* (2013.01); *H01M 10/052* (2013.01); *H01M 10/0562* (2013.01); *H01M 12/08* (2013.01); *H01M 2300/0068* (2013.01); *Y02E 60/122* (2013.01)
USPC ...................................... 429/223

(58) Field of Classification Search
None
See application file for complete search history.

(56) References Cited

U.S. PATENT DOCUMENTS

| | | |
|---|---|---|
| 4,812,375 A | 3/1989 | Foster |
| 5,006,428 A | 4/1991 | Goebel et al. |
| 5,427,872 A | 6/1995 | Shen et al. |
| 5,434,021 A | 7/1995 | Fauteux et al. |
| 5,529,860 A | 6/1996 | Skotheim |
| 5,532,077 A | 7/1996 | Chu |
| 5,536,599 A | 7/1996 | Alamgir et al. |
| 5,601,947 A | 2/1997 | Skotheim |
| 5,648,187 A | 7/1997 | Skotheim |
| 5,824,434 A | 10/1998 | Kawakami et al. |
| 5,961,672 A | 10/1999 | Skotheim |
| 6,017,651 A | 1/2000 | Nimon et al. |
| 6,025,094 A | 2/2000 | Visco et al. |

(Continued)

OTHER PUBLICATIONS

Chan Ki, Sang-Hee Park, Wan-Jin Lee, Kap-Seung Yang Characteristics of supercapaitor electrodes of PBI-based carbon nanofiber web prepared by electrospining. Aug. 6, 2004 Electrochimic Acta.*

(Continued)

*Primary Examiner* — Patrick Ryan
*Assistant Examiner* — Jose Colucci Rios

(57) ABSTRACT

A lithium secondary battery comprising a cathode, an anode, and a separator-electrolyte assembly or electrolyte layer disposed between the cathode and the anode, wherein the anode comprises: (a) an integrated nano-structure of electrically conductive nanometer-scaled filaments that are interconnected to form a porous network of electron-conducting paths comprising interconnected pores, wherein the filaments have a transverse dimension less than 500 nm; and (b) a foil of lithium or lithium alloy as an anode active material. The battery exhibits an exceptionally high specific capacity, an excellent reversible capacity, and a long cycle life.

31 Claims, 10 Drawing Sheets

(56) References Cited

U.S. PATENT DOCUMENTS

| | | | |
|---|---|---|---|
| 6,165,644 A | 12/2000 | Nimon et al. | |
| 6,194,098 B1 | 2/2001 | Ying et al. | |
| 6,194,099 B1 * | 2/2001 | Gernov et al. | 429/213 |
| 6,225,002 B1 | 5/2001 | Nimon et al. | |
| 6,395,423 B1 | 5/2002 | Kawakami et al. | |
| 6,432,586 B1 | 8/2002 | Zhang | |
| 6,537,701 B1 | 3/2003 | Nimon et al. | |
| 6,596,432 B2 | 7/2003 | Kawakami et al. | |
| 6,733,924 B1 | 5/2004 | Skotheim | |
| 6,797,428 B1 | 9/2004 | Skotheim | |
| 6,803,152 B2 | 10/2004 | Shembel et al. | |
| 6,936,381 B2 | 8/2005 | Skotheim | |
| 7,244,531 B2 | 7/2007 | Kim et al. | |
| 7,247,408 B2 | 7/2007 | Skotheim | |
| 7,282,295 B2 | 10/2007 | Visco et al. | |
| 7,282,296 B2 | 10/2007 | Visco et al. | |
| 7,282,302 B2 | 10/2007 | Visco et al. | |
| 2001/0028979 A1 * | 10/2001 | Takami | 429/218.1 |
| 2006/0107997 A1 * | 5/2006 | Matsui et al. | 136/263 |
| 2007/0020522 A1 * | 1/2007 | Obrovac et al. | 429/218.1 |
| 2007/0048619 A1 * | 3/2007 | Inda | 429/322 |
| 2007/0212583 A1 * | 9/2007 | Johnson | 429/27 |
| 2008/0261116 A1 * | 10/2008 | Burton et al. | 429/231.8 |
| 2009/0068553 A1 * | 3/2009 | Firsich | 429/122 |
| 2009/0214944 A1 * | 8/2009 | Rojeski | 429/142 |
| 2010/0261071 A1 * | 10/2010 | Lopatin et al. | 429/345 |
| 2011/0008705 A1 * | 1/2011 | Zheng et al. | 429/480 |
| 2011/0311876 A1 * | 12/2011 | Sturgeon et al. | 429/232 |

OTHER PUBLICATIONS

U.S. Appl. No. 10/919,959, filed Aug. 6, 2004, A. J. Bhattacharyya, et al.
U.S. Appl. No. 12/006,209, filed Jan. 2, 2008, A. Zhamu et al.
U.S. Appl. No. 12/009,259, filed Jan. 18, 2008, A. Zhamu et al.
U.S. Appl. No. 12/589,999, filed Nov. 2, 2009, A. Zhamu, et al.
A. Zhamu, et al., Energy Environ. Sci., 2012, 5, 5701-5707.

* cited by examiner

ANODE COMPOSITIONS FOR LITHIUM SECONDARY BATTERIES

FIELD OF THE INVENTION

The present invention provides a nano-structured material composition for use as an anode material in a secondary or rechargeable battery, particularly lithium metal battery and lithium metal-air battery.

BACKGROUND

The description of prior art will be primarily based on the references listed below:

List of References
1. D. L. Foster, "Separator for lithium batteries and lithium batteries including the separator," U.S. Pat. No. 4,812,375, Mar. 14, 1989.
2. D. H. Shen, et al. "Dendrite preventing separator for secondary lithium batteries," U.S. Pat. No. 5,427,872, Jun. 27, 1995.
3. F. Goebel, et al., "Getter Electrodes and Improved Electrochemical Cell Containing the Same," U.S. Pat. No. 5,006,428 (Apr. 9, 1991).
4. D. Fauteux, et al., "Secondary Electrolytic Cell and Electrolytic Process," U.S. Pat. No. 5,434,021 (Jul. 18, 1995).
5. M. Alamgir, et al. "Solid polymer electrolyte batteries containing metallocenes," U.S. Pat. No. 5,536,599, Jul. 16, 1996.
6. S. Kawakami, et al., "Secondary batteries," U.S. Pat. No. 5,824,434, Oct. 20, 1998.
7. S. Kawakami, et al., "High energy density secondary battery for repeated use," U.S. Pat. No. 6,395,423, May 28, 2000.
8. S. Kawakami, et al., "Rechargeable batteries," U.S. Pat. No. 6,596,432, Jul. 22, 2003.
9. Z. Zhang, "Separator for a high energy rechargeable lithium battery," U.S. Pat. No. 6,432,586, Aug. 13, 2002.
10. T. A. Skotheim, "Stabilized Anode for Lithium-Polymer Battery," U.S. Pat. No. 5,648,187 (Jul. 15, 1997); U.S. Pat. No. 5,961,672 (Oct. 5, 1999).
11. Q. Ying, et al., "Protective Coating for Separators for Electrochemical Cells," U.S. Pat. No. 6,194,098 (Feb. 27, 2001).
12. T. A. Skotheim, et al. "Lithium Anodes for Electrochemical Cells," U.S. Pat. No. 6,733,924 (May 11, 2004); U.S. Pat. No. 6,797,428 (Sep. 28, 2004); U.S. Pat. No. 6,936,381 (Aug. 30, 2005); and U.S. Pat. No. 7,247,408 (Jul. 24, 2007).
13. E. M. Shembel, et al., "Non-aqueous Electrolytes Based on Organosilicon Ammonium Derivatives for High-Energy Power Sources," U.S. Pat. No. 6,803,152 (Oct. 12, 2004).
14. H. Kim, et al., "Non-aqueous Electrolyte and Lithium Battery Using the Same," U.S. Pat. No. 7,244,531 (Jul. 17, 2007).
15. Y. S, Nimon, et al., "Dioxolane as a Protector for Lithium Electrodes," U.S. Pat. No. 6,225,002 (May 1, 2001).
16. Y. S, Nimon, et al., "Methods and Reagents for Enhancing the Cycling Efficiency of Lithium Polymer Batteries," U.S. Pat. No. 6,017,651 (Jan. 25, 2000); U.S. Pat. No. 6,165,644 (Dec. 26, 2000); and U.S. Pat. No. 6,537,701 (Mar. 25, 2003).
17. S. J. Visco, et al., "Protective Coatings for Negative Electrodes," U.S. Pat. No. 6,025,094 (Feb. 15, 2000).
18. S. J. Visco, et al., "Protected Active Metal Electrode and Battery Cell Structures with Non-aqueous Interlayer Architecture," U.S. Pat. No. 7,282,295 (Oct. 16, 2007); U.S. Pat. No. 7,282,296 (Oct. 16, 2007); and U.S. Pat. No. 7,282,302 (Oct. 16, 2007).
19. A. J. Bhattacharyya and J. Maier, "Non-aqueous Electrolyte for Use in a Battery," U.S. patent application Ser. No. 10/919,959 (Aug. 6, 2004).
20. D. J. Burton, et al, "Method of Depositing Silicon on Carbon Materials and Forming an Anode for Use in Lithium Ion Batteries," US Pub No. 2008/0261116 (Oct. 23, 2008).
21. D. W. Firsich, "Silicon-Modified Nanofiber Paper As an Anode Material for a Lithium Ion Battery," US Patent Publication 2009/0068553 (Mar. 23, 2009).
22. Aruna Zhamu and Bor Z. Jang, "Hybrid Nano Filament Anode Compositions for Lithium Ion Batteries," U.S. patent application Ser. No. 12/006,209 (Jan. 2, 2008).
23. Aruna Zhamu and Bor Z. Jang, "Hybrid Nano Filament Cathode Compositions for Lithium Ion and Lithium Metal Batteries," U.S. patent application Ser. No. 12/009,259 (Jan. 18, 2008).
24. Aruna Zhamu and Bor Z. Jang, "Nano-structured Anode Compositions for Lithium Metal and Lithium-Air Secondary Batteries," U.S. patent application Ser. No. 12/589,999 (Nov. 2, 2009).

Lithium Metal Secondary Batteries:

Lithium-ion and lithium (Li) metal cells (including Li metal-air or, simply, Li-air cells) are considered promising power sources for electric vehicle (EV), hybrid electric vehicle (HEV), and portable electronic devices, such as laptop computers and mobile phones. Lithium metal has the highest capacity (3,861 mAh/g) compared to any other metal or metal-intercalated compound (except $Li_{4.4}Si$) as an anode active material. Hence, in general, Li metal (including Li-air) batteries have a significantly higher energy density and power density than lithium ion batteries.

Historically, rechargeable lithium metal batteries were produced using non-lithiated compounds having high specific capacities, such as $TiS_2$, $MoS_2$, $MnO_2$, $CoO_2$ and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon cycling, the lithium metal resulted in the formation of dendrites that ultimately caused unsafe conditions in the battery. As a result, the production of these types of secondary batteries was stopped in the early 1990's giving ways to lithium-ion batteries.

Even now, cycling stability and safety concerns remain the primary factors preventing the further commercialization of Li metal batteries for EV, HEV, and microelectronic device applications. Specific cyclic stability and safety issues of lithium metal rechargeable batteries are primarily related to the high tendency for Li to form dendrite structures during repeated charge-discharge cycles or an overcharge, leading to internal electrical shorting and thermal runaway.

Many attempts have been made to address the dendrite-related issues, as summarized below:

Foster [Ref. 1] proposed a multilayer separator that included a porous membrane and an electro-active polymeric material contained within the separator materials. The polymer is capable of reacting with any lithium dendrite that might penetrate the separator, thus preventing the growth of dendrites from the anode to cathode that otherwise would cause internal shorting.

In a technically similar fashion, Shen, et al. [Ref. 2], used a non-reactive first porous separator (e.g., porous polypropylene) adjacent to the lithium anode and a second fluoropolymer separator between the cathode and the first separator. The second separator (e.g., polytetrafluoro ethylene) is reactive with lithium. As the tip of a lithium dendrite comes into contact with the second separator, an exothermic reaction occurs locally between the lithium dendrite and the fluoropolymer separator, resulting in the prevention of the dendrite propagation to the cathode.

Goebel, et al. [Ref. 3], proposed a "getter" electrode positioned between the anode and the cathode and was separated from the cathode and anode by fiberglass paper separators. The getter layer, composed of carbon or graphite material disposed on surfaces of these separators, serves as a low-capacity cathode that quickly discharges any Li dendrite that comes in contact with the getter layer.

Fauteux, et al. [Ref. 4], applied to a metal anode a protective surface layer (e.g., a mixture of polynuclear aromatic and polyethylene oxide) that enables transfer of metal ions from the metal anode to the electrolyte and back. The surface layer is also electronically conductive so that the ions will be uniformly attracted back onto the metal anode during electrodeposition.

Alamgir, et al. [Ref. 5], used ferrocenes to prevent chemical overcharge and dendrite formation in a solid polymer electrolyte-based rechargeable battery.

Kawakami, et al. [Ref. 6], observed that internal shorting could be prevented by using a multi-layered metal oxide film as a separator with small apertures through which lithium ions can pass and the growth of dendrites can be inhibited. Kawakami, et al. [Ref. 7], further suggested that the use of a first thin-film coating on the anode and a second thin film coating on the cathode, with both coatings permeable to lithium ions, could be effective in preventing dendrite formation. The first film can contain a large ring compound, an aromatic hydrocarbon, a fluoro-polymer, a glassy metal oxide, a cross-linked polymer, or a conductive powder dispersion. However, the dendrite-preventing mechanisms of these films were not clearly explained. Kawakami, et al. [Ref. 8], also found that some size mismatch between the anode and the cathode (with the anode being larger) seems to be effective in preventing dendrite formation.

Zhang [Ref. 9] disclosed a separator that is composed of a ceramic composite layer (to block dendrite growth) and a polymer micro-porous layer (to block ionic flow between the anode and cathode in the event of a thermal runaway).

Skotheim [Ref. 10] provided a Li metal anode that was stabilized against the dendrite formation by the use of a vacuum-evaporated thin film of a Li ion-conducting polymer interposed between the Li metal anode and the electrolyte. Ying, et al. [Ref. 11], proposed a separator that comprises a micro-porous pseudo-boehmite layer and a polymer-based protective coating layer. It was speculated that this separator had a small pore structure (10 µm or less) and sufficient mechanical strength to prevent the Li dendrite from contacting the cathode and causing internal shorting. Skotheim, et al. [Ref. 12], proposed a multilayer anode structure consisting of a Li metal-based first layer, a second layer of a temporary protective metal (e.g., Cu, Mg, and Al), and a third layer that is composed of at least one layer (typically 2 or more layers) of a single ion-conducting glass, such as lithium silicate and lithium phosphate, or polymer. It is clear that such an anode active material, consisting of at least 3 or 4 layers, is too complex and too costly to make and use.

Protective coatings for Li anodes, such as glassy surface layers of LiI—$Li_3PO_4$—$P_2S_5$, may be obtained from plasma assisted deposition [Ref. 17]. Complex, multi-layer protective coatings were also proposed by Visco, et al. [Ref. 18].

Organic additives that were used to stabilize the lithium anode active surface include (a) an organosilicon backbone with pyridinium groups bound to the backbone [Ref. 13], (b) halogenated organic metal salts [Ref. 14], and (c) dioxolane [Ref. 15]. Nimon, et al. [Ref. 16], developed methods and reagents for enhancing the cycling efficiency of lithium polymer batteries. The methods entailed forming a protective layer (e.g., $LiAlCl_4.3SO_4$ and $Al_2S_3$) on the lithium metal anode surface through a reaction of electrolyte species with lithium metal.

Despite these earlier efforts, no rechargeable Li metal batteries have yet succeeded in the market place. This is likely due to the notion that these prior art approaches still have major deficiencies. For instance, in several cases, the anode or electrolyte structures are too complex. In others, the materials are too costly or the processes for making these materials are too laborious or difficult. Clearly, an urgent need exists for a simpler, more cost-effective, and easier to implement approach to preventing Li metal dendrite-induced internal short circuit and thermal runaway problems in Li metal batteries and other rechargeable batteries.

Lithium Ion Secondary Batteries:

Parallel to these efforts and prompted by the aforementioned concerns over the safety of earlier lithium metal secondary batteries led to the development of lithium ion secondary batteries, in which pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized.

The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g. In other graphitized carbon materials than pure graphite crystals, there exists a certain amount of graphite crystallites dispersed in or bonded by an amorphous or disordered carbon matrix phase. The amorphous phase typically can store lithium to a specific capacity level higher than 372 mAh/g, up to 700 mAh/g in some cases, although a specific capacity higher than 1,000 mAh/g has been sporadically reported. Hence, the magnitude of x in a carbonaceous material $Li_xC_6$ varies with the proportion of graphite crystallites and can be manipulated by using different processing conditions. An amorphous carbon phase alone tends to exhibit a low electrical conductivity (high charge transfer resistance) and, hence, a high polarization or internal power loss. Conventional amorphous carbon-based anode materials also tend to give rise to a high irreversible capacity.

In addition to carbon- or graphite-based anode materials, other inorganic materials that have been evaluated for potential lithium ion anode applications include metal oxides, metal nitrides, metal sulfides, and a range of metals, metal alloys, and intermetallic compounds that can accommodate lithium atoms/ions. In particular, lithium alloys having a composition formula of $Li_aA$ (A is a metal such as Al, and "a" satisfies $0<a\leq5$ when the battery is fully charged) has been investigated as potential anode materials. This class of anode material has a higher theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), $LiZn$ (410 mAh/g), and $Li_3Bi$ (385 mAh/g). However, for the anodes composed of these materials, pulverization (fragmentation of the alloy particles) proceeds with the progress of the charging and discharging cycles due to expansion and contraction of the anode during the absorption and desorption of the lithium ions. The expansion and contraction also tend to result in reduction in or loss of particle-to-particle contacts or contacts between the anode and its current collector. These adverse effects result in a significantly shortened charge-discharge cycle life.

To overcome the problems associated with such mechanical degradation, composites composed of small, electrochemically active particles supported by less active or non-active matrices have been proposed for use as an anode material. Examples of these active particles are Si, Sn, and $SnO_2$. However, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

Lithium Metal-Air Secondary Cells:

Metal-air batteries are unique in that they make use of oxygen from the atmosphere as the cathode reactant. A cathode active material is not required to be included in the cell because the oxygen consumed at the cathode is taken from the ambient. This feature allows metal-air cells to have extremely high energy densities. Among all metal elements, the metal with the highest operational voltage and greatest theoretical specific energy is lithium. However, there have been several major issues associated with the construction of lithium-air cells:

First, the utilization of an aqueous electrolyte has not been feasible due to corrosion of the lithium metal anode by water. This issue was addressed by Abraham and Jiang, U.S. Pat. No. 5,510,209, who demonstrated a cell with a non-aqueous polymer separator consisting of a film of polyacrylonitrile swollen with electrolyte solution of propylene carbonate/ethylene carbonate/$LiPF_6$. This organic electrolyte membrane was sandwiched between a lithium metal foil anode and a carbon composite cathode to form the lithium-air cell. The utilization of the organic electrolyte allowed good performance of the cell in an oxygen or dry air atmosphere. The cells were reported to deliver a specific energy of 250-350 Wh/kg, based on the mass of the electrodes and electrolytes but not including the mass of the envelope package.

However, this lithium-air cell was plagued by a second issue: the capacity was limited by the formation of the $Li_2O$ discharge product which eventually blocked the pores of the carbon cathode, which was composed of graphite powder supported by a nickel screen. Furthermore, lithium-air secondary cells are also subject to the same dendrite-related issues as lithium metal secondary cells.

Highest Specific Capacity Anode Materials

Most significantly, lithium metal (including pure lithium, alloys of lithium with other metal elements, or lithium-containing compounds) still provides the highest anode specific capacity as compared to essentially all anode active materials (except pure silicon, but silicon has pulverization issues discussed above). Lithium metal would be an ideal anode material in a lithium metal or lithium-air secondary battery if dendrite related issues could be addressed.

It may be noted that in both lithium-ion and lithium metal secondary batteries, it is lithium ions that run back and force between the anode and the cathode. The amount of lithium pre-stored in the electrodes (anode and cathode) ultimately dictates the cell capacity and energy. In a Li-ion cell, the needed amount of lithium is normally fully stored in the cathode active material (e.g., lithiated cobalt oxide) when a cell is made due to the notion that cathode active materials, such as lithium transition metal oxide and lithium transition metal phosphate, are relatively stable in open air and can be more easily handled in a real manufacturing environment. Using pure Si as an example, the anode is free of lithium and the anode active material is 100% Si to begin with (before the first charging operation). The anode active material becomes $Li_{4.4}Si$ when the anode is fully charged (with lithium ions supplied from the pre-lithiated cathode active material). Such a conventional practice of storing lithium in the cathode has several drawbacks:

First, most of the cathode active materials (e.g., lithium cobalt oxide and lithium iron phosphate) have a very low specific capacity (typically in the range of 130-170 mAh/g) and, hence, a larger amount of cathode (than anode) materials has to be packed into a cell. It is desirable to have lithium-free cathode active material so that more cathode active material can be incorporated if lithium is stored at the anode side.

Second, this practice also precludes the use of several high capacity cathode materials since these materials cannot be conveniently formed in a lithiated state.

In order to overcome these issues, in a slightly earlier application [Ref. 24], we incorporated surface-stabilized fine lithium particles as the anode active material mixed in a nano-structure of nano-filaments. As opposed to using surface-stabilized particles (which remain quite expensive), the instant application makes use of substantially pure lithium or lithium alloy that is in a foil form (preferred) or in a lithium rod form. Optionally, the lithium foil or rod can be surface-passivated or slightly alloyed or reacted with other elements to increase the air stability for easy handling of the anode during cell manufacturing. However, surface passivation is not a necessary requirement in the instant application. The conductive nano-filaments used in the anode of the instant application, to be discussed in the next section, are intended for serving as a substrate on which lithium will be deposited as a thin coating after the first charging operation and during subsequent re-charges. Although some of the nano-filaments, such as carbon nano-fibers, can be intercalated by lithium ions, this intercalation is not a primary function of these nano-filaments.

Hence, an object of the present invention was to provide a simple (not too complex), cost-effective, and easier-to-implement approach to preventing Li metal dendrite-induced internal short circuit and thermal runaway problems in Li metal or Li-air batteries.

Another object of the present invention was to provide a nano-structured composition for use as a Li metal anode that is resistant to dendrite formation and provides a Li metal cell that exhibits a long and stable cycling response.

Still another object of the present invention was to provide a lithium metal cell that exhibits a high specific capacity, high specific energy, good resistance to dendrite formation, and a long and stable cycle life.

A further object of the present invention was to provide a Li metal secondary cell wherein both the anode and the cathode comprise an integrated nano-structure of conductive nano-filaments with a lithium foil disposed at the anode as a primary source of lithium ions and a cathode active material bonded to or coated on surfaces of the nano-filaments.

Yet another object of the present invention was to provide a lithium-air cell that exhibits a high specific capacity, high specific energy, good resistance to dendrite formation, and a long and stable cycle life.

Yet another object of the present invention was to provide a lithium-air cell wherein the anode comprises a nano-structured composition (integrated structure of conductive nano-filaments) and a lithium foil, and the air cathode comprises an integrated structure of conductive nano-filaments. The integrated structure, being highly conductive, can also function as a current collector, obviating the need to have a separate current collector at either the anode or the cathode side. Such a configuration can significantly reduce the overhead weights of a cell, thereby affording an ultra-high specific capacity and specific energy.

SUMMARY OF THE INVENTION

This invention provides a nano-structured anode composition for a lithium metal cell. The composition comprises: (a) an integrated nano-structure of electrically conductive nanometer-scaled filaments (nano-filaments) that are interconnected to form a porous network of electron-conducting paths comprising interconnected pores, wherein the nano-filaments have a transverse dimension less than 500 nm (preferably less than 100 nm); and (b) a foil or rod of lithium or lithium alloy. Also provided are a lithium metal cell (or battery) and a lithium metal-air cell (or battery) comprising such an anode. The battery exhibits an exceptionally high specific capacity, an excellent reversible capacity, and a long cycle life.

Preferably, multiple conductive nano-filaments are processed to form an integrated aggregate or web structure, characterized in that these filaments are intersected, overlapped, or somehow bonded (e.g., using a binder material) to one another to form a network of electron-conducting paths. The integrated structure has substantially interconnected pores that are intended for accommodating the electrolyte in a battery. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

It may be noted that Burton et al [Ref. 20] and Firsich [Ref. 21] used carbon nano-fibers to support silicon coating obtained via chemical vapor deposition (CVD), but their applications were related to lithium ion batteries, not lithium metal or lithium-air batteries. It was the CVD silicon (not lithium) that was the anode active material and no lithium foil was used in their anodes. The required lithium was stored in their cathode active materials. The instant applicants, Zhamu and Jang, also disclosed a 3-D integrated structure either for supporting Si nano particles as an anode active material [Ref. 22] or for supporting lithium transition metal oxide or lithium transition metal phosphate as a cathode active material [Ref. 23] in a Li-ion cell, not a lithium metal cell. Neither application was directed at using lithium foil as the anode active material. In the anode structure of the instant invention, upon re-charging, essentially all the returning lithium ions are deposited onto the surface of the nano-filaments to form a nano-scaled coating. In contrast, the returning lithium ions in these earlier applications [Ref. 20-Ref. 22] were mostly inserted into the Si coating or particles (causing volume swelling of Si coating or particles), and electro-plating of lithium onto the fiber surface would have been considered undesirable for fear of dendrite formation. The applicants were most surprised to observe no dendrite formation in the anodes of the instant lithium metal or lithium metal-air batteries after a large number of discharge-charge cycles.

An NGP is essentially composed of a sheet of graphene plane or multiple sheets of graphene plane stacked and bonded together through van der Waals forces. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 0.5 μm and 10 μm, but could be longer or shorter. The NGPs, just like other elongate bodies (carbon nano tubes, carbon nano fibers, metal nano wires, etc.), readily overlap one another to form a myriad of electron transport paths for improving the electrical conductivity of the anode. Hence, the electrons generated by lithium during discharging can be readily collected.

The filament is characterized by having an elongate axis (length or largest dimension) and a first transverse dimension (smallest dimension, such as a thickness of an NGP or a diameter of a fiber, tube, or wire) wherein the thickness or diameter is smaller than 100 nm and the length-to-diameter or length-to-thickness ratio is no less than 10 (typically much higher than 100). In the case of an NGP, the platelet has a length, a width, and a thickness, wherein the length-to-width ratio is preferably at least 3.

The integrated structure of the integrated anode composition preferably comprises a gradient structure. In other words, when implemented in a lithium metal cell, the integrated structure comprises a gradient structure having a first surface facing an anode collector and a second (opposed) surface facing a separator or cathode, wherein the first surface and the second surface have different nano-filament compositions, different physical densities, or different levels of porosity. Preferably, there is a higher porosity level near the second surface with the porosity level tapering off to a lower level near the first surface.

In one preferred embodiment, the lithium or lithium alloy foil is surface-coated with carbon dioxide, fluorine, fluorine-containing compound, wax, lithium oxide, lithium nitride, lithium chloride, lithium bromide, sodium chloride, potassium chloride, petroleum pitch, coal tar pitch, polymer, organic substance, or inorganic material. The lithium foil (surface-passivated or non-passivated) can be inserted between an anode current collector (e.g., Cu foil) and a nano-structure (mat, web, or paper) of nano-filaments. Alternatively, the foil can be inserted between a nano-structure (mat, web, or paper) of nano-filaments and a separator.

Another preferred embodiment of the present invention is a lithium secondary battery comprising a positive electrode (cathode), a negative electrode (anode), and a non-aqueous electrolyte (or combined electrolyte and a separator) disposed between the negative electrode and the positive electrode. The anode comprises a nano-structured composition composed of interconnected conductive nano-filaments having pores and a lithium foil.

The positive electrode may comprise a cathode active material selected from (a) lithiated transition metal oxides or sulfides, such as lithium cobalt oxide, lithium nickel oxide, lithium manganese oxide, oxides of multiple transition metals, $TiS_2$, and $MoS_2$; (b) lithium transition metal phosphates, such as lithium iron phosphate, lithium vanadium phosphate, lithium manganese phosphate, and lithium multiple transition metal phosphate; (c) sulfur-based materials, such as elemental sulfur, sulfur-containing molecule, sulfur-containing compound, and sulfur-carbon polymer; or (d) a combination thereof. In items (a) and (b) above, the cathode active material may be selected from their un-lithiated versions (e.g., cobalt oxide, not lithium cobalt oxide) when a cell is made. After the first discharge operation, these materials will become lithiated (e.g., cobalt oxide becomes lithium cobalt oxide).

There is really no limitation on the kind of cathode active material that can be used for practicing the present invention. For a lithium metal-air secondary cell, the cathode may comprise just a host material (no cathode active material other than oxygen from the air or an oxygen source).

The cathode active material may be in a powder form which is bonded by a resin binder, along with conductive additives (such as carbon black or fine graphite particles). But, preferably, the same type of integrated, nano-structure of nano-filaments is used to host the cathode active material, which can be in a powder form in physical contact with the nano-structure or in a thin-film form coated onto a surface of the nano-structure. Hence, another preferred embodiment of the present invention is a lithium metal secondary battery that contains the aforementioned anode composition (with a nano-structure and a Li foil) and a positive electrode comprising (a) an integrated structure of electrically conductive nanometer-scaled filaments that are interconnected to form a porous network of electron-conducting paths comprising interconnected pores, wherein the filaments have a transverse dimension less than 500 nm (preferably less than 100 nm); and (b) a cathode active material bonded to or in physical contact with the integrated structure.

The electrolyte may be selected from the group consisting of polymer electrolyte, polymer gel electrolyte, solid-state electrolyte, composite electrolyte, soft matter phase electrolyte, and combinations thereof. In one preferred embodiment, a separator is used to support electrolyte and the separator is disposed between an anode and a cathode to prevent the anode from contacting the cathode. At least a portion of the electrolyte is hosted by a separator. The separator typically is porous having pores therein to host at least a portion of the electrolyte.

The present lithium metal secondary battery, if containing a sulfur-based cathode active material, can provide a specific capacity greater than 500 mAh per gram of the total battery weight including anode, cathode, electrolyte, and separator component weights together. In many cases, the cell provides a specific capacity greater than 700 mAh per gram. These represent some of the best specific capacities ever reported for lithium ion, lithium metal, and lithium-air batteries.

The present invention also provides a lithium metal-air battery comprising an air cathode, an anode comprising a nano-structured composition as defined above, and electrolyte, or electrolyte combined with a separator, disposed between the anode and the air cathode. In the air cathode, oxygen from the open air (or from an oxygen supplier external to the battery) is the primary cathode active material. The air cathode needs an inert material to support the lithium oxide material formed at the cathode. The applicants have surprisingly found that the same type of integrated structure of conductive nano-filaments used for the anode can also be used as an air cathode intended for supporting the discharge product (e.g., lithium oxide). This is advantageous since the same type of integrated structure can be used for both the cathode and the anode, thereby simplifying the battery fabrication.

Hence, a further embodiment of the present invention is a lithium metal-air battery, wherein the air cathode comprises an integrated structure of electrically conductive nanometer-scaled filaments that are interconnected to form a porous network of electron-conducting paths comprising interconnected pores, wherein the filaments have a transverse dimension less than 500 nm (preferably less than 100 nm). The same type of integrated structure is also used for the anode to support the stabilized lithium particles.

The presently invented nano-structured material technology has several major advantages, summarized as follows:
  (1) The stabilized lithium particles can be mixed with the nano-filaments to form a 3-D integrated structure in a real battery manufacturing environment since the stabilized lithium particles are relatively stable with respect to air and air-born moisture for a reasonable period of time.
  (2) During the first discharge cycle, lithium ions are released from the stabilized lithium particles and transported through electrolyte (and a separator, if existing) to reach the cathode. The geometry, stiffness, and strength of the nano-filaments (e.g., CNF, CNT, metal nano wire, and NGP), preferably bonded by a binder, enables the integrated 3-D structure to maintain its shape and dimension during this discharge and subsequent re-charge cycles.
  (3) During the first re-charge operation, lithium ions move from the cathode back to the anode and deposit onto the surface of nano-filaments to form a lithium metal coating. Lithium no longer is formed into individual or isolated particles. The nano-filaments selected in the present invention are chemically and thermo-mechanically compatible with lithium, to the extent that the lithium coating maintains a good contact with its underlying substrate filament during repeated charge/discharge cycles. It seems that the integrated aggregate or web of filaments, being mechanically strong and tough, is capable of accommodating or cushioning any strains or stresses imposed on the filaments without fracturing and without changing its shape and dimension.
  (4) Most surprisingly, the nano-structure provides an environment that is conducive to uniform deposition of lithium atoms, to the extent that no geometrically sharp structures or dendrites were found in the anode after a large number of cycles. Not wishing to be limited by any theory, but the applicants envision that the 3-D network of highly conductive filaments provide substantially uniform electric fields and, hence, uniform attraction of lithium ions back onto the filament surfaces during re-charging.
  (5) The nano-structure with thin lithium coating is capable of quickly releasing lithium and thus capable of being discharged at a high rate. This is a highly beneficial feature for a battery that is intended for high power density applications such as electric vehicles.
  (6) The interconnected network of filaments forms a continuous path for electrons, resulting in significantly reduced internal energy loss or internal heating.
  (7) The same type of integrated structure of conductive nano-filaments can be used as a support for cathode active material, significantly simplifying the battery fabrication operations.
  (8) Traditionally, a lithium ion battery is manufactured with the cathode being pre-lithiated and the anode being free from lithium because un-stabilized lithium coated on graphite particles is highly sensitive to oxygen and moisture (not suitable for handling in the open air). Also, lithium intercalated graphite or carbon particles, even if available, would be difficult to make and handle. Unfortunately, some of the lithium that is transported to the anode during the first charging cycle of a lithium ion battery is used to form a solid-electrolyte interface and other irreversible reactants. As a result, the amount of lithium available for shuttling back and force between the anode and cathode (the amount that dictates the battery capacity) is significantly reduced. Furthermore, such a practice of using a pre-lithiated cathode material is only applicable to a limited number of cathode active materials (e.g., transition metal oxide and lithium ion phosphate) and precludes several high-capacity cathode active materials (e.g., sulfur-based) from being used in a lithium ion battery. The lithium metal battery of the instant application is not subject to this limitation. The amount of the available lithium can be easily adjusted to account for any potential irreversibility in addition to the required amount to be incorporated in the cathode active materials. Furthermore, the anode composition as disclosed in the present application, if coupled with sulfur-based cathode active material, can provide an overall battery specific capacity much greater than 600 mAh/g (based on the total weight of anode, cathode, electrolyte, and separator components) and can be even greater than 1,000 mAh/g.

These and other advantages and features of the present invention will become more transparent with the description of the following best mode practice and illustrative examples.

During the first discharge cycle of the cell, lithium ions move to the cathode side, leaving behind an empty space, possibly disconnecting the current collector from the electrolyte-separator layer. Upon cycling, dendrites tend to be formed at the anode side.

Figure 3:
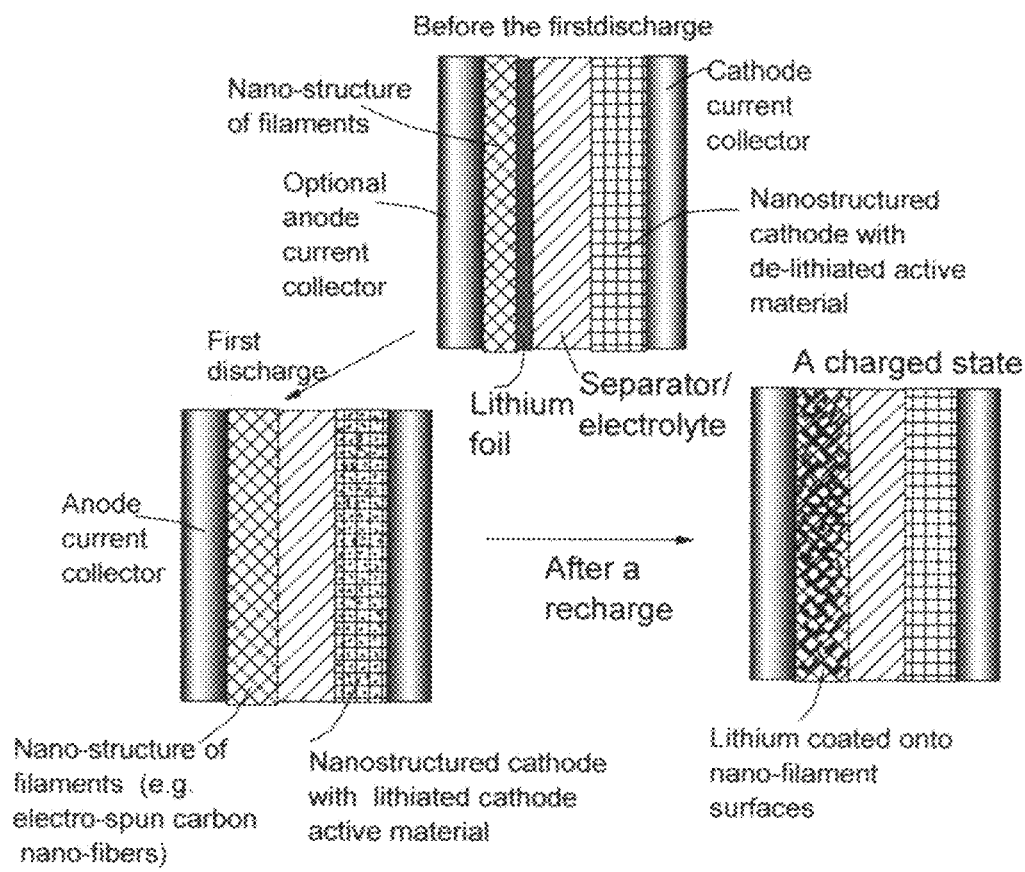

FIG. 3 Schematic of a lithium metal cell according to a preferred embodiment of the present invention. A lithium foil is dispersed between a nano-structure (mat, web, or paper) of nano-filaments and a separator prior to the first discharge cycle. Upon discharging, lithium ions move to the cathode side, but the elastic 3-D nano-structure acts to bridge the anode current collector to the electrolyte-separator layer. Upon re-charging, lithium ions return to the anode side, naturally depositing a thin layer of lithium onto the surface of conductive filaments.

Figure 4:
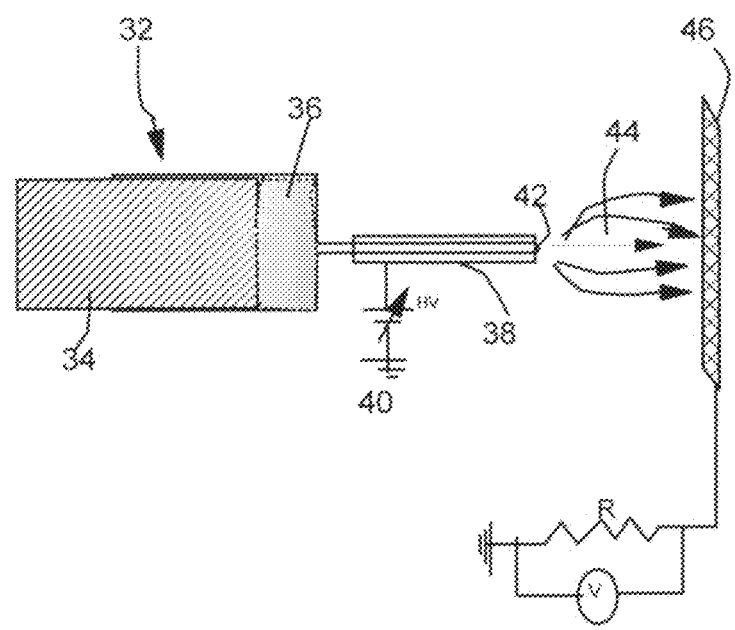

FIG. 4 Schematic of an electro-spinning apparatus to produce nano-fibers.

Figure 5:
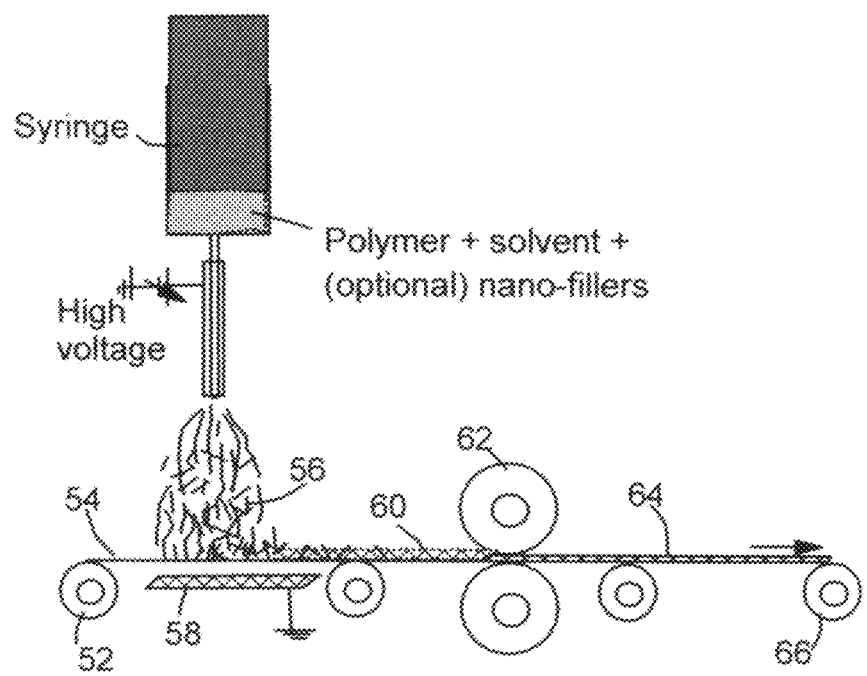

FIG. 5 Schematic of a roll-to-roll apparatus for producing a roll of mats or webs from electro-spun nano-fibers.

Figure 6:
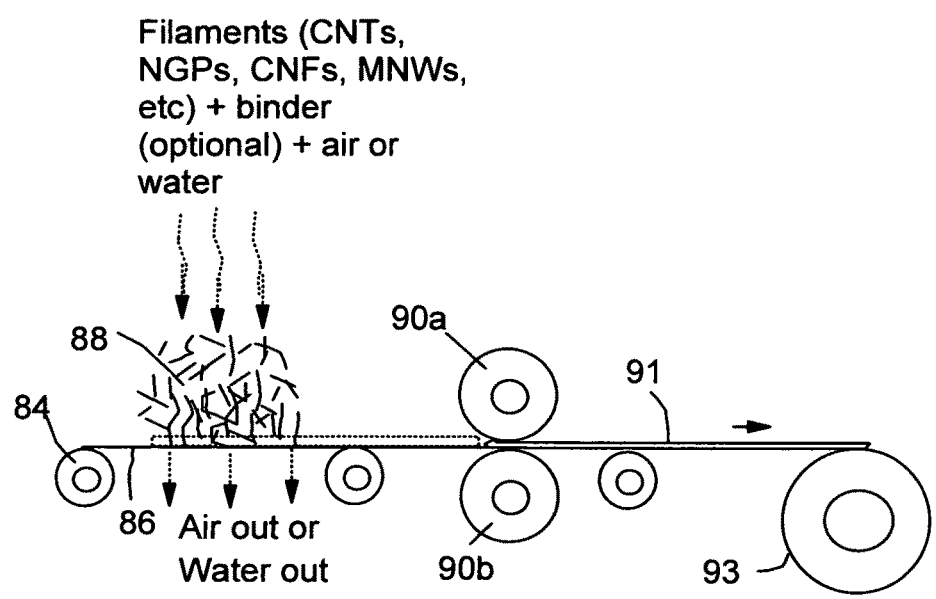

FIG. 6 Schematic of a roll-to-roll apparatus for producing a roll of mats or webs from various conductive filaments.

Figure 7:
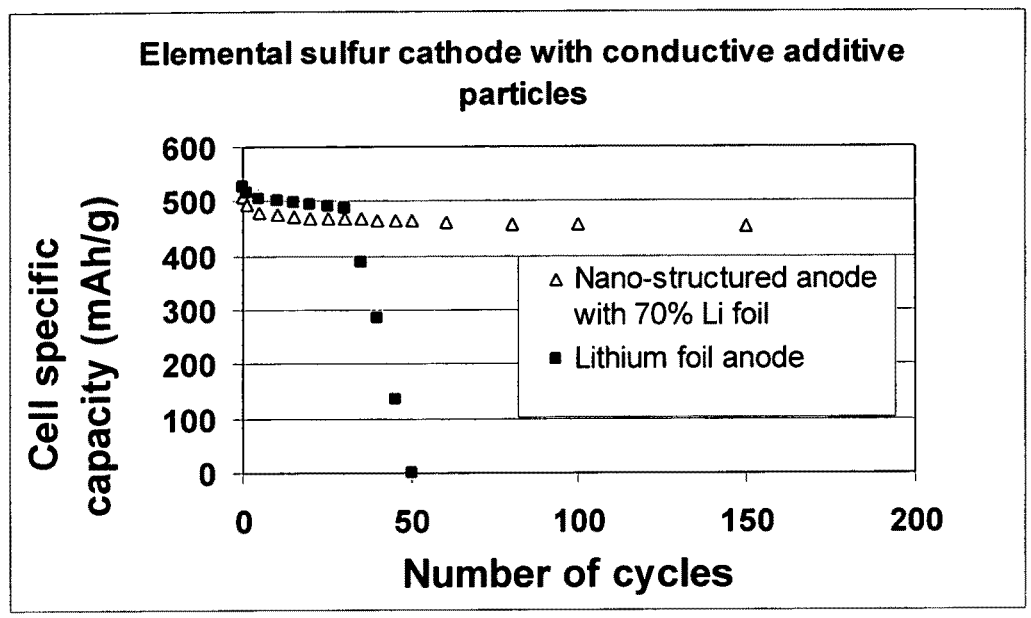

FIG. 7 Two series of cell specific capacity data, one for a Li—S cell featuring a nano-structured anode containing approximately 70% stabilized lithium particles and a cathode containing 36% active sulfur prepared in Example 6 and the other for a Li—S cell featuring a lithium foil anode and a cathode containing 36% active sulfur prepared in Comparative Example 6.

Figure 8:
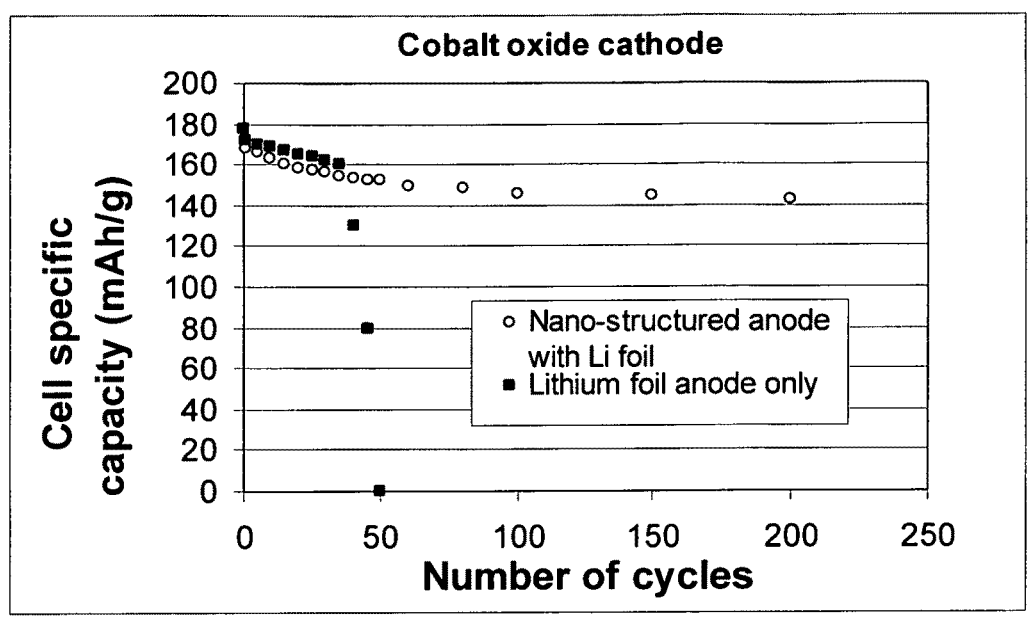

FIG. 8 Specific capacities of two lithium metal secondary cells featuring cobalt oxide as a cathode active material (one prepared in Example 8 and the other in Comparative Example 8) plotted as a function of the number of charge-discharge cycles.

Figure 9:
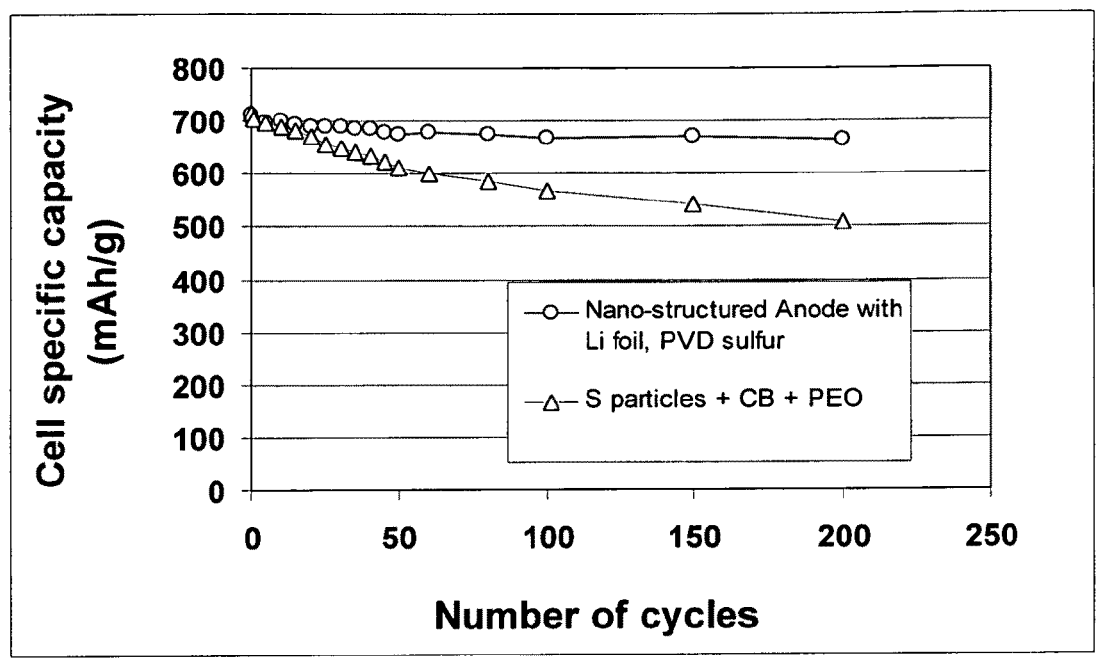

FIG. 9 Cell specific capacity behaviors of two comparable Li—S cells (both with 70% active Li at the anode and 54% active sulfur at the cathode). One cell features a cathode prepared by physical vapor deposition of sulfur on the filament surface of a nano-structured cathode (top curve, one of the cells fabricated in Example 7). The other cell features a cathode prepared by mixing elemental sulfur with carbon black and other additives, followed by coating the resulting paste on a stainless steel current collector (bottom curve).

Figure 10:
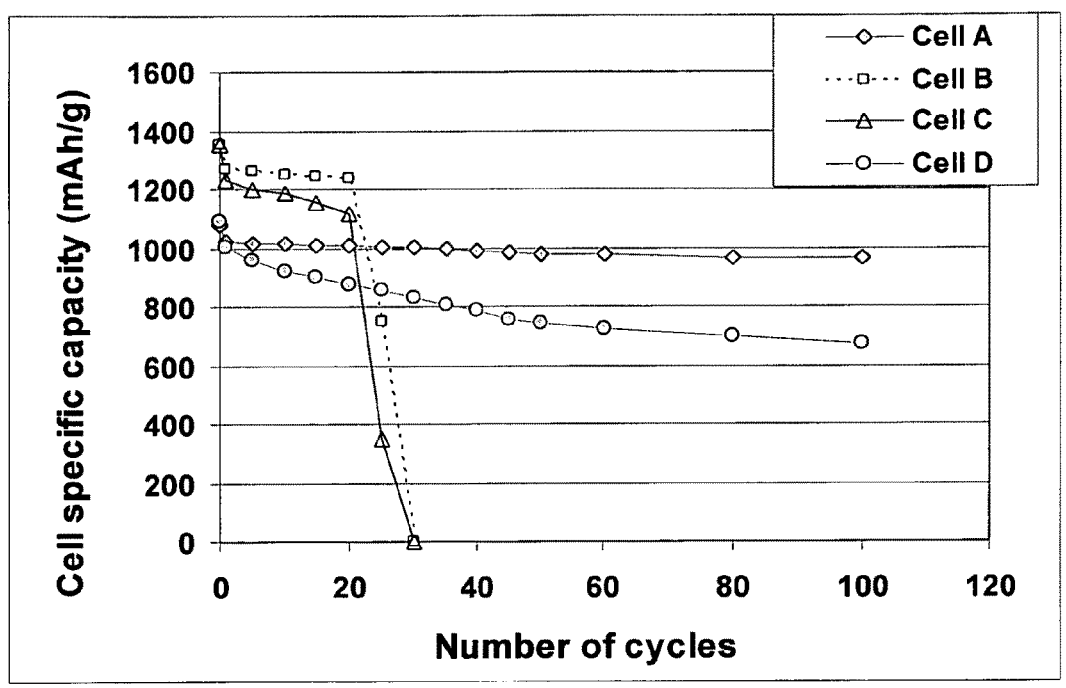

FIG. 10 Cell specific capacities of four lithium-air cells: Curve A=cell with a nano-structured anode containing stabilized Li particles and a nano-structured cathode (an integrated 3-D mat of nano-filaments, also serving as a current collector); Curve B=cell with a lithium foil anode and a nano-structured cathode (an integrated 3-D mat of nano-filaments, also serving as a current collector); Curve C=cell with a Li foil anode and a graphite powder-Ni screen cathode structure (also serving as a current collector); and Curve D=cell with a nano-structured anode containing stabilized Li particles and a graphite powder-Ni screen cathode structure.

DETAILED DESCRIPTION OF PREFERRED EMBODIMENTS

This invention is related to anode structures or assemblies for high-capacity lithium metal or lithium-air secondary batteries, which are preferably secondary batteries based on a non-aqueous electrolyte, a polymer gel electrolyte, a soft matter phase electrolyte, a solid-state electrolyte, or a composite electrolyte. The shape of a lithium secondary battery can be cylindrical, square, button-like, etc. The present invention is not limited to any battery shape or configuration.

Figure 1:
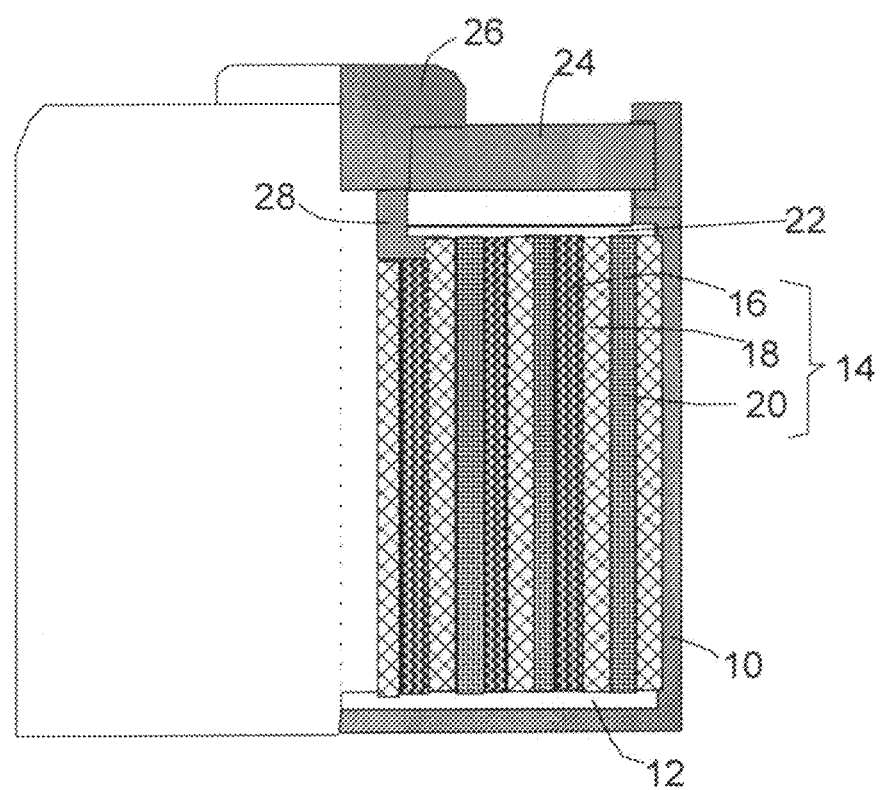
FIG. 1 Schematic of a cylinder-shape lithium ion or lithium metal battery.

As an example, a cylindrical battery configuration is schematically shown in FIG. 1. A cylindrical case 10 made of stainless steel has, at the bottom thereof, an insulating body 12. An assembly 14 of electrodes is housed in the cylindrical case 10 such that a strip-like laminate body, comprising a positive electrode 16, a separator 18, and a negative electrode 20 stacked in this order, is spirally wound with a separator being disposed at the outermost side of the electrode assembly 14. The cylindrical case 10 is filled with an electrolyte. A sheet of insulating paper 22 having an opening at the center is disposed over the electrode assembly 14 placed in the cylindrical case 10. An insulating seal plate 24 is mounted at the upper opening of the cylindrical case 10 and hermetically fixed to the cylindrical case 10 by caulking the upper opening portion of the case 10 inwardly. A positive electrode terminal 26 is fitted in the central opening of the insulating seal plate 24. One end of a positive electrode lead 28 is connected to the positive electrode 16 and the other end thereof is connected to the positive electrode terminal 26. The negative electrode 20 is connected via a negative lead (not shown) to the cylindrical case 10 functioning as a negative terminal.

The present invention provides a nano-structured anode composition for a lithium metal cell or a lithium metal-air cell. The composition comprises: (a) an integrated 3-D nano-structure of electrically conductive nanometer-scaled filaments (nano-filaments) that are interconnected to form a porous network of electron-conducting paths comprising interconnected pores, wherein the nano-filaments have a transverse dimension less than 500 nm (preferably less than 100 nm); and (b) foil of lithium or lithium alloy as an anode active material. The battery featuring such an anode exhibits an exceptionally high specific capacity, an excellent reversible capacity, and a long cycle life.

The integrated nano-structure may be disposed between the lithium or lithium alloy foil and the separator-electrolyte assembly or electrolyte layer. Alternatively, the lithium or lithium alloy foil is disposed between the integrated nano-structure and the separator-electrolyte assembly or electrolyte layer.

The use of a nano-structure layer (a continuous sheet of web, mat, or paper) and a sheet of Li foil is consistent with current lithium ion, lithium-air, or lithium metal battery production procedures. In other words, the nano-structure layer and Li foil layer are combined to replace what would be an anode coating layer in a Li-ion cell production process.

The resulting nano-structure/Li foil anode assembly, when incorporated as an anode in a lithium metal battery or lithium metal-air battery, surprisingly shows very stable cycling behavior, having no non-uniform deposition of lithium or formation of dendrites. Dendrites have been commonly found in conventional lithium metal and lithium metal-air secondary batteries.

Figure 2:
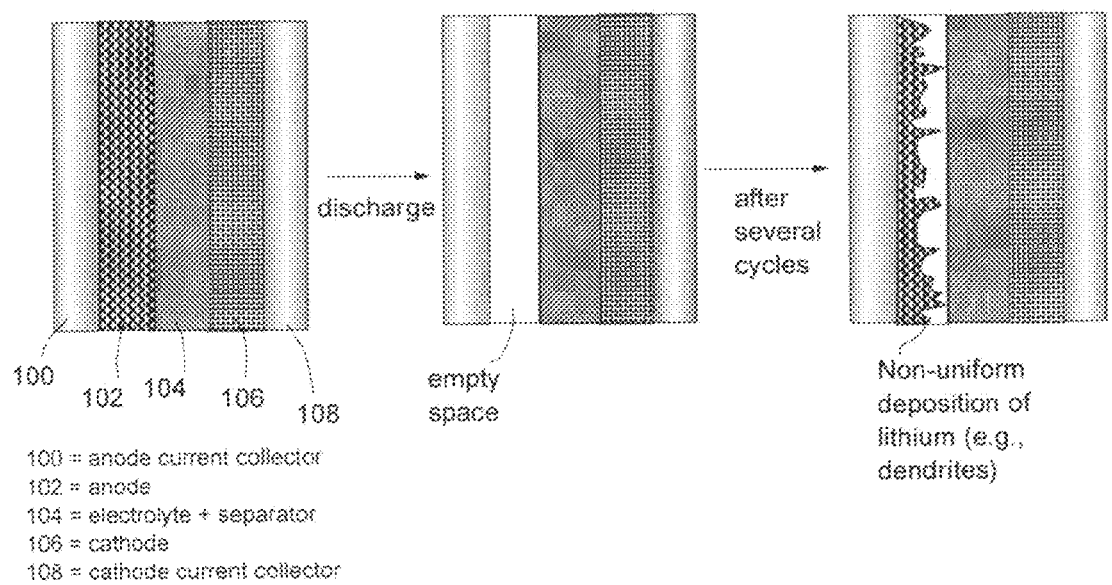
FIG. 2 Schematic of a prior art lithium metal cell using a lithium foil as an anode structure.

As schematically illustrated in FIG. 2, a conventional lithium metal cell may be comprised of an anode current collector 100, an anode 102 comprising a lithium metal foil or coating, an electrolyte phase 104 (optionally but preferably supported by a separator, hereinafter referred to as the electrolyte-separator layer), a cathode 106, and a cathode collector 108. During the first discharge operation, lithium ions are released from the anode and moved to the cathode side, leaving behind an empty space between the anode current collector and a separator. This configuration presents several challenging problems to the battery designer. First, there might be a gap or disconnection between the anode current collector and the separator or electrolyte, disrupting the lithium deposition process during re-charging of the battery. Second, there is limited conductive surface to accept depositing lithium ions because the front surface (facing the original lithium foil) of the anode current collector has a "relatively small surface area," limiting the over-all speed of lithium deposition (hence, the battery cannot be re-charged at a high rate). Such a "relatively small surface area" is with respect to the ultra-high surface area provided by the nano-scaled filaments that constitute the 3-D porous structure. Third, the planar geometry of the anode current collector, disposed at a distance from the separator, tends to lead to non-uniform deposition of lithium during re-charging of the battery, resulting in the formation of dendrites. All these challenging problems have been solved by the presently invented nano-structured anode composition.

As schematically shown in FIG. 3, the nano-structured anode is composed of a 3-D porous structure of highly conductive nano-filaments having spaces or pores between filaments, and a lithium or lithium alloy foil. During the first discharge cycle, lithium ions are released from the lithium foil and transported through electrolyte (and a separator, if existing) to reach the cathode. The geometry, stiffness, elasticity, and strength of the nano-filaments (e.g., CNF, CNT, metal nano wire, and NGP), preferably bonded by a binder, enables the integrated 3-D structure to slightly expand to maintain contact with both the anode current collector and the separator and maintain its shape and dimension during subsequent re-charge/discharge cycles.

More significantly, during the first re-charge operation, lithium ions move from the cathode back to the anode and deposit onto the surface of nano-filaments to form a uniform lithium metal coating. Lithium no longer is formed into a thin foil structure. The nano-filaments selected in the present invention are chemically and thermo-mechanically compatible with lithium so that the lithium coating maintains a good and uniform contact with its underlying substrate filament during repeated charge/discharge cycles.

Most surprisingly and significantly, the nano-structure provides an environment that is conducive to uniform deposition of lithium atoms, to the extent that no geometrically sharp structures or dendrites were found in the anode after a large number of cycles. Not wishing to be bound by any theory, but the applicants envision that the 3-D network of highly conductive nano-filaments provide a substantially uniform attraction of lithium ions back onto the filament surfaces during re-charging. This is an unexpected result that no prior art worker has ever reported.

Furthermore, due to the nanometer sizes of the filaments, there is a large amount of surface area per unit volume or per unit weight of the nano-filaments. This ultra-high specific surface area offers the lithium ions an opportunity to uniformly deposit a lithium metal coating on filament surfaces at a high rate, enabling high re-charge rates for a lithium metal or lithium metal-air secondary battery.

The positive electrode (cathode) active materials are well-known in the art. The positive electrode can be manufactured by the steps of (a) mixing a positive electrode active material with a conductive additive (conductivity-promoting ingredient, such as carbon black) and a binder, (b) dispersing the resultant mixture in a suitable solvent, (c) coating the resulting suspension on a cathode current collector, and (d) removing the solvent from the suspension to form a thin plate-like electrode. The positive electrode active material may be selected from a wide variety of transition metal oxides (lithiated or un-lithiated), such as manganese dioxide, lithium/manganese composite oxide, lithium-containing nickel oxide, lithium-containing cobalt oxide, lithium-containing nickel cobalt oxide, lithium-containing iron oxide, lithium-containing vanadium oxide, and various transition metal sulfides. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium vanadium phosphate, and other lithium transition metal phosphate materials because these oxides and phosphates provide a high cell voltage and good cycling stability.

It is of significance to note that the cathode active material does not have to be in a lithiated state when a battery cell is made since the anode contains a source of lithium (the lithium or lithium alloy foil). For instance, manganese oxide can be used, instead of lithium manganese oxide. This would allow a cell to contain a greater amount of cathode active material, which usually has a significantly lower specific capacity than the anode active material and a cell would require a much greater amount of cathode materials than anode.

Of particular interest to the present invention is a cathode active material based on elemental sulfur or sulfur-containing molecule or compound, further explained as follows:

To achieve high capacity in electric current producing cells or batteries, it is desirable to have a high quantity or loading of electrode active material in the cathode layer. For example, the volume of cathode layer in an AA size battery is typically about 2 $cm^3$. If the specific capacity of the cathode active material is 200 mAh/g, the amount or volumetric density of the cathode active material in the cathode layer would need to be at least 500 $mg/cm^3$ in order to have the 1 gram of cathode active material in the AA size battery necessary to provide a capacity of 200 mAh or 0.2 Ah. If the volumetric density of cathode active material in the cathode layer can be increased to higher levels (e.g., by reducing the non-active cathode materials such as conductive additives or binder materials), such as greater than 700 mg/cm³, the capacity of the battery can be proportionately increased to higher levels. Further, if the specific capacity of the cathode active material can be increased from 200 mAh/g (e.g., for lithium cobalt oxide) to 1,000 mAh/g (e.g., sulfur-containing compound), then the capacity of an AA battery can be significantly increased, given the same volume of cathode layer used. One particular goal of the research and development efforts that led to the instant application was to achieve both the volumetric density and the specific capacity of cathode active materials for use in the present lithium metal cells.

Sulfur and sulfur-based molecules or compounds are particularly desirable cathode active materials for use in practicing the present invention. Lithium and sulfur are highly desirable as the electrochemically active materials for the anode and cathode, respectively, because they provide nearly the highest energy density possible on a weight or volume basis of any of the known combinations of active materials. To obtain high energy densities, the lithium can be present as the pure metal or in an alloy (in a lithium-metal cell or lithium-air cell), or in an intercalated form (in a lithium-ion cell), and the sulfur can be present as elemental sulfur or as a component in an organic or inorganic material with a high sulfur content, preferably above 50 weight percent sulfur. For example, in combination with a lithium anode (theoretical specific capacity=3,861.7 mAh/g), elemental sulfur has a theoretical specific capacity of 1,675 mAh/g, and carbon-sulfur polymer materials with trisulfide and longer polysulfide groups in the polymer have shown specific capacities of 1,200 mAh/g. These high specific capacities are particularly desirable for applications where low weight and/or low volume of the battery are important, such as portable electronic devices and electric vehicles.

In the present context, the term "carbon-sulfur polymer materials" refers to those carbon-sulfur polymers with carbon-sulfur single bonds and with sulfur-sulfur bonds forming trisulfide (—SSS—) and higher polysulfide linkages. These carbon-sulfur polymer materials comprise, in their oxidized state, a polysulfide moiety of the formula, $-S_m-$, wherein m is an integer equal to or greater than 3. For example, these carbon-sulfur polymer materials are described in U.S. Pat. Nos. 5,601,947 and 5,529,860. Organo-sulfur materials with only disulfide groups typically show specific capacities in the range of 300 to 700 mAh/g and are accordingly less desirable for those applications requiring high specific capacities.

Those skilled in the art of battery design and fabrication realize that practical battery cells comprise, in addition to cathode and anode active materials, other non-electroactive materials, such as a container, current collectors, electrode separators, polymeric binders, conductive additives and other additives in the electrodes, and an electrolyte. The electrolyte is typically an aqueous or non-aqueous liquid, gel, or solid material containing dissolved salts or ionic compounds with good ionic conductance but poor electronic conductivity. All of these additional non-electroactive components are typically required to make the battery perform efficiently, but their use effectively reduces the gravimetric and volumetric energy density of the cell. Therefore, it is desirable to keep the quantities of these non-electroactive materials to a minimum so as to maximize the amount of electrode active material in the battery cell.

For the anode, the presently invented 3-D integrated structure can be made to contain a pore level as low as 5% and as high as 95%, but preferably between 10% and 90%, and more preferably between 50% and 90%. A good proportion of lithium foil can be incorporated in the anode structure, preferably having a nanostructure-to-Li foil ratio between 10/1 and 1/10.

For a conventional cathode layer containing transition metal oxides as a cathode active material, these oxides typically have some electrically conductive properties and are typically microporous so that high levels of added conductive fillers are not required. With sulfur-based compounds, which have much higher specific capacities than the transition metal oxides, it is difficult to obtain efficient electrochemical utilization of the sulfur-based compounds at high volumetric densities because the sulfur-based compounds are highly insulating and are generally not microporous. For example, U.S. Pat. No. 5,532,077 to Chu describes the problems of overcoming the insulating character of elemental sulfur in composite cathodes and the use of a large volume fraction of an electronically conductive material (carbon black) and of an ionically conductive material (e.g., polyethylene oxide or PEO) in the composite electrode to try to overcome these problems. Typically, Chu had to use nearly 50% or more of non-active materials (e.g., carbon black, binder, PEO, etc), effectively limiting the relative amount of active sulfur. Furthermore, presumably one could choose to use carbon paper (instead of or in addition to carbon black) as a host for the cathode active material. However, this conventional carbon fiber paper does not allow a sufficient amount of cathode active material to be coated on the large-diameter carbon fiber surface yet still maintaining a low coating thickness, which is required of a reduced lithium diffusion path length for improved charge/discharge rates and reduced resistance. In other words, in order to have a reasonable proportion of an electrode active material coated on a large-diameter fiber, the coating thickness has to be proportionally higher. A thicker coating would mean a longer diffusion path for lithium to come in and out, thereby slowing down the battery charge/discharge rates. The instant application solved these challenging problems by using an integrated 3-D nano-structure of conductive nano-filaments to host the active sulfur.

As opposed to carbon paper (often used as a host for elemental sulfur, conductive additives, ion conductors, and electrolyte) that was composed of micron-scaled carbon fibers (typically having a diameter of >12 µm), the instant application makes use of mats or webs of nano-scaled filaments with a diameter less than 500 nm, preferably less than 100 nm. The diameters of these fibers or filaments are a critically important factor that had been largely ignored or overlooked by the workers in the art of designing electrodes. This was not trivial or obvious to one of ordinary skills in the art. This is further explained as follows:

The conductive filaments of the instant application, such as CNTs, CNFs, and NGPs, have a diameter or thickness less than 500 nm (mostly <100 nm). The anode or cathode active material coating (e.g., lithium for the anode or sulfur for the cathode) is preferably less than 500 nm in thickness, and more preferably less than 100 nm in thickness. The ratio between the coating layer thickness and the underlying filament diameter is a critically important parameter in the design of the instantly invented anode or cathode structure. The goal here is to obtain an active material-coated nano-filament with a high proportion of electrode active material relative to the nano-filament proportion because it is the active material (not the underlying nano-filament) that absorbs or desorbs lithium ions (at the cathode side), hence dictating the lithium storage capacity of the battery. This is a particularly important issue for the cathode since the cathode active material typically has a relatively low specific Li storage capacity as compared to the anode active material (lithium metal in the present case). One would want to have as much cathode active material (as little non-active, supporting material) as possible. If the coating thickness-to-filament diameter ratio is critically important, then why does the absolute diameter of a nano-filament matter?

Let us begin the discussion by using, as an example, a small-diameter nano-filament (say 100 nm for a multi-walled CNT or CNF) having thereon a cathode active material coating of 50 nm in thickness. Then, the volume fraction of the coating (with respect to the total volume of the coating layer and the filament together) will be 75%. Now consider a large-diameter fiber (say 12 μm for Chu's carbon fibers), the cathode coating layer (sulfur) has to be 6 μm thick in order to have a 75% cathode active material. This implies that the Lithium ions near the cathode have to travel (via diffusion) a distance of up to 6 μm during the battery discharge process. In contrast, the required diffusion path for the Lithium ions in our coated CNT is only 50 nm. The required time can be reduced by a factor of $(6 \times 10^3/50)^2 = 14,400$ since $D \cdot t = X^2$ (an approximation known in the field of diffusion theory), where D=diffusion coefficient, t=diffusion time, and X=diffusion distance. This implies that the battery charge/discharge rate can be improved by up to 4 orders of magnitude with the instantly invented cathode. Since sulfur is highly insulating (resistant to electron transport), a thick sulfur layer means a high internal resistance for the cathode. Furthermore, a necessarily thick cathode active material coating (on large-diameter fibers) implies a high tendency to get fragmented (pulverized) when the charge-discharge cycles continue (particularly for lithium metal oxide-type cathode active materials).

The above remarks have further shown that the instant nano-structure (if used as a cathode structure) was not just an expedient variation of any prior art work or a mere variation of filament size to achieve optimization of properties. For instance, Chu did not suggest the approach of coating a thin film of a cathode active material (sulfur) on the surface of micron-sized fibers (Chu suggested elemental sulfur precipitated out as particles), let alone coating on nano-filaments that are totally different classes of materials. Rather, Chu obtained a mixture of sulfur, carbon black (electronically conductive additive), polyethylene oxide (ion-conductive additive), and other additives and directly coated this mixture to a stainless steel cathode current collector.

The interconnected network of nano-filaments forms a continuous path for electrons, resulting in significantly reduced internal energy loss or internal heating for either the anode or the cathode (or both). This network is electronically connected to a current collector and, hence, all filaments are essentially connected to the current collector. In the instant invention, the coating is wrapped around a filament and, even if the coating were to fracture into separate segments, individual segments would still remain in physical contact with the underlying filament, which is essentially part of the current collector. The electrons transported to the cathode can be distributed to all cathode active coatings.

The lithium metal cell of the instant application can have a nano-structure anode and a more conventional cathode structure, although such a cathode structure is not preferred. In a more conventional cathode structure, acetylene black, carbon black, or ultra-fine graphite particles may be used as a conductive additive. The binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used as a binder. Preferable mixing ratio of these ingredients may be 80 to 95% by weight for the positive electrode active material, 3 to 20% by weight for the conductive additive, and 2 to 7% by weight for the binder. The cathode current collector may be selected from aluminum foil, stainless steel foil, and nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

The negative electrode (anode) structure, which the instant invention provides, is now further explained in more detail as follows: The material composition comprises (a) an aggregate of nanometer-scaled, electrically conductive filaments that are substantially interconnected, intersected, or percolated to form a porous, electrically conductive filament network, wherein the filament network comprises substantially interconnected pores and the filaments have an elongate dimension and a first transverse dimension with the first transverse dimension being less than 500 nm (preferably less than 100 nm) and an elongate dimension-to-first transverse dimension aspect ratio being preferably greater than 10 (preferably length-to-diameter or length-to-thickness ratio greater than 100); and (b) foil of lithium or lithium alloy as an anode active material. The nano-structure layer and the foil are part of a multi-layer structure of a cell, including an anode current collector-nanostructure-Li foil-separator-cathode layer-cathode current collector or an anode current collector-Li foil-nanostructure-separator-cathode layer-cathode current collector.

Preferably, multiple conductive filaments are processed to form an aggregate or web, characterized in that these filaments are intersected, overlapped, or somehow bonded to one another to form a network of electron-conducting paths. Although not a necessary condition, a binder material may be used to bond the filaments together to produce an integral web. The binder material may be a non-conductive material, such as polyvinylidene fluoride (PVDF) and poly(tetrafluoroethylene) (PTFE). However, an electrically conductive binder material is preferred, which can be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline). The aggregate or web has substantially interconnected pores that are intended for accommodating the electrolyte in a battery.

The nano-filament may be selected from, as examples, a carbon nano fiber (CNF), graphite carbon fiber (GNF), carbon nano-tube (CNT), metal nano wire (MNW), metal-coated nano fiber, nano-scaled graphene platelet (NGP), or a combination thereof. The filament is characterized by having an elongate axis (length or largest dimension) and a first transverse dimension (smallest dimension, such as a thickness of an NGP or a diameter of a fiber, tube, or wire) wherein the thickness or diameter is smaller than 100 nm and the length-to-diameter or length-to-thickness ratio is no less than 10, preferably greater than 100. In the case of an NGP, the platelet has a length, a width, and a thickness, wherein the length-to-width ratio is preferably at least 3 and the length-to-thickness ratio is typically greater than 1,000.

The most important property of a filament herein used to support a lithium coating (upon re-charging) is a high electrical conductivity to enable facile collection of electrons produced by lithium metal with minimal resistance. A low conductivity implies a high resistance and high energy loss, which is undesirable. The filament should also be chemically and thermo-mechanically compatible with the intended active material (i.e., lithium at the anode) to ensure a good contact between the filament and the coating upon repeated charging/discharging and heating/cooling cycles.

In the present application, nano-wires primarily refer to elongate solid core structures with diameters below approximately 100 nm and nanotubes generally refer to elongate, single or multi-walled hollow core structures with diameters below approximately 100 nm. Whiskers are elongate solid core structures typically with a diameter greater than 100 nm. However, carbon nano tubes (CNTs) specifically refer to hollow-core structures with a diameter smaller than 10 nm. Both hollow-cored and solid-cored carbon- or graphite-based filaments with a diameter greater than 10 nm are referred to as carbon nano fibers (CNFs) or graphite nano fibers (GNFs), respectively. Graphite nano fibers are typically obtained from carbon nano fibers through a heat treatment (graphitization) at a temperature greater than 2,000° C., more typically greater than 2,500° C.

Catalytic growth is a powerful tool to form a variety of wire or whisker-like structures with diameters ranging from just a few nanometers to the micrometer range. A range of phases (gas, solid, liquid, solution, and supercritical fluid) have been used for the feeder phase, i.e. the source of material to be incorporated into the nano-wire.

A range of metal catalysts have been shown to work for the synthesis of carbon nano fibers and CNTs. For instance, pyrolysis of ethanol can be used in the presence of Fe, Co or Ni (the most common catalysts), Pt, Pd, Cu, Ag, or Au for the growth of single-walled carbon nanotubes (SW-CNT). For the latter three metals to work, not only do they have to be clean to start with, they must also be smaller than 5 nm in diameter for growth to be efficient. Both CNTs and vapor-grown CNFs are now commercially available, but at an extremely high cost. Metal nano wires can be produced using solution phase reduction, template synthesis, physical vapor deposition, electron beam lithography, and electrodeposition. These are now well-known in the art and CNTs, CNFs, and nano-wires are commercially available from multiple sources.

The nano graphene platelets (NGPs) may be obtained from intercalation, exfoliation, and separation of graphene sheets in a laminar graphite material selected from natural graphite, synthetic graphite, highly oriented pyrolytic graphite, graphite fiber, carbon fiber, carbon nano-fiber, graphitic nano-fiber, spherical graphite or graphite globule, meso-phase microbead, meso-phase pitch, graphitic coke, or polymeric carbon. For instance, natural graphite may be subjected to an intercalation/oxidation treatment under a condition comparable to what has been commonly employed to prepare the so-called expandable graphite or stable graphite intercalation compound (GIC). This can be accomplished, for instance, by immersing graphite powder in a solution of sulfuric acid, nitric acid, and potassium permanganate for preferably 2-24 hours (details to be described later). The subsequently dried product, a GIC, is then subjected to a thermal shock (e.g., 1,000° C. for 15-30 seconds) to obtain exfoliated graphite worms, which are networks of interconnected exfoliated graphite flakes with each flake comprising one or a multiplicity of graphene sheets. The exfoliated graphite is then subjected to mechanical shearing (e.g., using an air milling, ball milling, or ultrasonication treatment) to break up the exfoliated graphite flakes and separate the graphene sheets. The platelet surfaces can be readily deposited with a coating of the active material. We have found that intercalation and exfoliation of graphite fibers result in the formation of NGPs with a high length-to-width ratio (typically much greater than 3). The length-to-thickness ratio is typically much greater than 100.

Another particularly preferred class of electrically conductive filaments includes nano fibers obtained via electro-spinning of polymer-containing fluids or pitch. The main advantage of electro-spinning is the ability to produce ultra-fine fibers ranging from nanometer to submicron in diameter. The electro-spinning process is fast, simple, and relatively inexpensive. The process can be used to form fibers from a wide range of polymer liquids in solution or melt form. The polymer may contain a desired amount of conductive additives to make the spun fibers electrically conductive. Because of the extremely small diameters and excellent uniformity of electro-statically spun fibers, high-quality non-woven fabrics or webs having desirable porosity characteristics can be readily produced by this technique. Many electro-spun polymer fibers can be subsequently heat-treated or carbonized to obtain carbon nano fibers. For instance, polyacrylonitrile (PAN), copolymers of pyromellitic dianhydride (PMDA) and 4,4'-oxydianiline (ODA), and CNT- or NGP-containing PAN can be made into a solution, which is then electro-spun into nanometer fibers. The fibers can be successfully carbonized at 1000° C. to produce carbon fiber webs with a tensile strength of 5.0 MPa (or much higher if containing CNTs or NGPs) and an electrical conductivity of >2.5 S/cm. The electrical conductivity can be increased by up to 4 orders of magnitude if the carbonized fiber is further graphitized at a temperature higher than 2,500° C.

The polymer nano fibers can be electrically conductive if the precursor polymer is intrinsically conductive (e.g., conjugate chain polymers such as polyaniline, PANi). Conductive fillers, such as carbon black, nano metal particles, CNTs, and NGPs, may be added to the polymer solution prior to electro-spinning. The resulting electro-spun fibers will be electrically conductive. A polymer fiber may become surface-conductive if the fiber surface is deposited with a conductive material, such as copper or conductive polymer. In addition, carbonization and optional graphitization of a polymer fiber can significantly increase the electrical conductivity. A major advantage of electro-spun and carbonized nano fibers is its low cost, which can be an order of magnitude less expensive than vapor-grown CNFs and two orders of magnitude less expensive than CNTs.

For illustration purposes, electro-spinning of a polymer or a polymer containing a conductive additive (e.g., NGPs or carbon black) is herein described. As schematically shown in FIG. 4, the process begins with the preparation of a polymer solution and, if NGPs are needed, dispersion of NGPs in a polymer-solvent solution to prepare a suspension solution, which is contained in a chamber 36 of a syringe-type configuration 32. The syringe may be connected to a metering pump or simply contains a drive cylinder 34, which can be part of a metering device. A metal-coated syringe needle 38 serves as an electrode, which is connected to a high-voltage power supply 40. When a proper voltage is applied, charges begin to build up in the suspension. At a critical charge level, repulsive forces overcome the surface tension of the suspension, ejecting streams of fluid out of an orifice 42. The streams of suspension, in the form of thin, elongated fibrils 44, move toward a collector screen 46 while the solvent vaporizes, leaving behind dried fibrils that are collected on the screen, which may be electrically grounded or at a potential different than the potential at the needle electrode 48. The collector screen 46 serves to collect the nanocomposite fibrils produced. Electro-spinning apparatus are well-known in the art.

In a best mode of practice for producing electro-spun NGP-containing polymer nano fibers, the preparation of a suspension solution for electro-spinning is accomplished by first preparing two solutions (A=solvent+NGPs and B=solvent+polymer) and then mixing the two solutions together to obtain the suspension solution. The NGPs may be added to a solvent with the resulting suspension being subjected to a sonication treatment to promote dispersion of separate NGPs in the solvent. This fluid is a solvent for the polymer, not for the NGPs. For NGPs, this fluid serves as a dispersing medium only. The resulting suspension solution is hereinafter referred to as Suspension A. Suspension solution B is obtained by dissolving the polymer in the solvent with the assistance of heat and stirring action. Suspensions A and B are then mixed together and, optionally, sonicated further to help maintain a good dispersion of NGPs in the polymer-solvent solution.

With a syringe needle nozzle tip of approximately 2-5 μm, the resulting nanocomposite fibrils have a diameter typically smaller than 300 nm and more typically smaller than 100 nm. In many cases, fibrils as small as 20-30 nm in diameter can be easily obtained. It is of great interest to note that, contrary to what would be expected by those skilled in the art, the NGP loading in the resulting nanocomposite fibrils could easily exceed 15% by weight. This has been elegantly accomplished by preparing the suspension solution that contains an NGP-to-polymer weight ratio of 0.15/0.85 with the ratio of (NGP+polymer) to solvent being sufficiently low to effect ejection of the suspension into fine streams of fluid due to properly controlled suspension solution viscosity and surface tension. Typically, the (NGP+polymer)-to-solvent ratio is between 1/5 and 1/10. The excess amount of solvent or dispersion agent was used to properly control the fluid properties as required. The solvent or dispersing agent can be quickly removed to produce dried nanocomposite fibrils with the desired NGP loading. The NGPs have a thickness preferably smaller than 10 nm and most preferably smaller than 1 nm. Preferably, the NGPs have a width or length dimension smaller than 100 nm and further preferably smaller than 30 nm. These NGP dimensions appear to be particularly conducive to the formation of ultra-fine diameter nanocomposite fibrils containing a large loading of NGPs.

Preferred matrix polymers are polyacrylonitrile (PAN) and a mixture of polyaniline (PANi) and polyethylene oxide (PEO). PAN fibrils obtained by electro-spinning can be readily converted into carbon nano fibers by heating the fibrils at a temperature of 150° C. to 300° C. in an oxidizing environment and then carbonizing the oxidized fibers at a temperature of 350° C. to 1,500° C. If further heat-treated at a temperature of 2,000° C. and 3,000° C., the carbon nano fibers become graphite nano fibers. The fibrils of the (PANi+PEO) mixture are intrinsically conductive and do not require any carbonization treatment. Electro-spinning also enables fibrils to intersect and naturally bond to one another for forming a web that has a desired network of conductive filaments.

For cathode application, the active material may be in a particle or coating form that is bonded or attached to the surfaces of filaments. The filaments form a network of electron transport paths for dramatically improved electrical conductivity or reduced internal resistance (hence, reduced energy loss and internal heat build-up). It appears that the mechanical flexibility and strength of the conductive filaments selected in the present study enables the coating to undergo strain relaxation quite freely in the radial directions during the charge-discharge cycling of the lithium battery. Consequently, the coating appears to remain in a good contact with the underlying filaments. Due to adequate strength and toughness, the filaments remain essentially intact when the coating undergoes expansion or contraction. No significant fragmentation of the coating was observed in all of the coated nano filaments investigated. Even if the coating were to get fractured into several segments, individual segments are still wrapped around a conductive filament and would not lose their electrical connection the anode current collector.

Multiple filaments can be easily combined to form an aggregate, such as in a mat, web, non-woven, or paper form. In the case of electro-spun fibrils, the fibrils may naturally overlap one another to form an aggregate upon solvent removal. Schematically shown in FIG. 5 is an innovative roll-to-roll process for continuously producing rolls of electro-spun nano fibril-based porous thin film, paper, mat, or web. The process begins with reeling a porous substrate 54 from a feeder roller 52. The porous substrate 54 is used to capture the electro-spun nano fibrils 56 that would otherwise be collected by a stationary collector 58 (disposed immediately below the moving substrate), which is now just a counter electrode for the electro-spinning apparatus disposed above the moving substrate. The collected fibril mat 60 may be slightly compressed by a pair of rollers 62. The rollers may be optionally heated to melt out the polymer surface in the nano fibrils to consolidate the mat 64 into an integral web. The web, paper, or mat may be continuously wound around a take-up roller 66 for later uses.

Several techniques can be employed to fabricate a conductive aggregate of filaments (a web or mat), which is a monolithic body having desired interconnected pores. In one preferred embodiment of the present invention, the porous web can be made by using a slurry molding or a filament/binder spraying technique. These methods can be carried out in the following ways:

As a wet process, an aqueous slurry is prepared which comprises a mixture of filaments and, optionally, about 0.1 wt % to about 10 wt % resin powder binder (e.g., phenolic resin). The slurry is then directed to impinge upon a sieve or screen, allowing water to permeate through, leaving behind filaments and the binder. As a dry process, the directed fiber spray-up process utilizes an air-assisted filament/binder spraying gun, which conveys filaments and an optional binder to a molding tool (e.g., a perforated metal screen shaped identical or similar to the part to be molded). Air goes through perforations, but the solid components stay on the molding tool surface.

Each of these routes can be implemented as a continuous process. For instance, as schematically shown in FIG. 6, the process begins with pulling a substrate 86 (porous sheet) from a roller 84. The moving substrate receives a stream of slurry 88 (as described in the above-described slurry molding route) from above the substrate. Water sieves through the porous substrate with all other ingredients (a mixture of filaments, stabilized lithium particles, and a binder) remaining on the surface of the substrate being moved forward to go through a compaction stage by a pair of compaction rollers 90a, 90b. Heat may be supplied to the mixture before, during, and after compaction to help cure the thermoset binder for retaining the shape of the resulting web or mat. The web or mat 91, with all ingredients held in place by the thermoset binder, may be stored first (e.g., wrapped around a roller 93).

In yet another preferred embodiment, the web may be made from nano filaments (such as NGPs, GNFs, CNTs, and metal nano wires) using a conventional paper-making process, which is well-known in the art.

A wide range of electrolytes can be used for practicing the instant invention. Most preferred are non-aqueous, polymer gel, and solid-state electrolytes although other types can be used. Polymer, polymer gel, and solid-state electrolytes are preferred over liquid electrolyte.

The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) effective in suppressing the reductive or oxidative decomposition of electrolyte; and (b) high in conductivity. A non-aqueous electrolyte solely composed of ethylene carbonate (EC) is advantageous in that it is relatively stable against carbonaceous filament materials. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

Solid lithium-ion conductors such as single crystals of $Li_3N$, glasses from the $LiI$—$Li_2S$—$B_2S_3$ system, and polymer electrolytes exhibit high ionic conductivity and, hence, can be used as a solid-state electrolyte in the presently invented cell. Solid ionic conductors based on a $LiM_2(PO_4)_3$ [M=Ti, Ge, etc. is a metal] structure analogous to a Nasicon-type structure, are a preferred group of oxide-based solid-state lithium-ion conductors. A particularly preferred group is lithium aluminum germanium phosphate (LAGP) glass-ceramic solid electrolytes primarily consisting of $Li_{1+x}Al_xGe_{2-x}(PO_4)_3$ (x=0.1-0.5) with superionic conductivity, as disclosed by Thokchom, et al [Thokchom, J. S., N. Gupta, and B. Kumar, "Superionic Conductivity in a LithiumAluminum Germanium Phosphate Glass-Ceramic," Journal of the Electrochemical Society, 2008. 155 (12) A915-A920]. The highly conductive phase is a derivative of $LiGe_2(PO_4)_3$ which possesses a rhombohedral structure (space group $R\overline{3}C$) with an open three-dimensional framework of $GeO_6$ octahedra sharing all corners with $PO_4$ tetrahedra. The lithium-ion occupies interstitial sites and its conduction takes place along the c-axis. The structure of LAGP implies the existence of Ge—O—P and A-O—P bonds of a covalent nature to form the basic network. The network structure also allows for the presence of conduction channels for fast lithium-ion transport. The lithium conductor exhibits single positive lithium-ion super conduction and no anionic contribution.

A particularly useful electrolyte-separator layer comprises a porous membrane having pores therein and a soft matter phase disposed in the pores, wherein the soft matter phase comprises oxide particles dispersed in a non-aqueous alkali, alkaline, or transition metal salt solution. The oxide particles in a soft matter phase are selected from $SiO_2$, $TiO_2$, $Al_2O_3$, MgO, or a combination thereof. Soft matter phase as electrolyte per se was discussed in Bhattacharyya, et al [Ref. 19]. The oxide particles preferably have a size smaller than 500 nm, more preferably smaller than 100 nm, and further preferably smaller than 50 nm. The oxide particles have a volume fraction preferably in the range of 2% to 80% based on the total volume of the oxide particles and the lithium salt solution, but more preferably in the range of 5% to 40%. The pores occupy a volume fraction of the porous membrane in the range of 20% to 95% inclusive, but preferably in the range of 50% to 85% inclusive. The pores have a size preferably smaller than 10 μm, but more preferably smaller than 2 μm.

EXAMPLES

In the examples discussed below, unless otherwise noted, raw materials such as silicon, germanium, bismuth, antimony, zinc, iron, nickel, titanium, cobalt, and tin were obtained from either Alfa Aesar of Ward Hill, Mass., Aldrich Chemical Company of Milwaukee, Wis. or Alcan Metal Powders of Berkeley, Calif. X-ray diffraction patterns were collected using a diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. In several cases, scanning electron microscopy (SEM) and transmission electron microscopy (TEM) were used to characterize the structure and morphology of the hybrid material samples.

A nano-structured anode, comprising nano-filaments and stabilized lithium particles, was bonded onto a copper foil to be employed as a collector. After being dried, web-copper foil configuration was hot-pressed to obtain a negative electrode or, alternatively, a complete cell was fabricated by laminating an anode current collector (e.g., Cu foil), an anode layer (e.g., a nano-structured web), an electrolyte-separator layer, a cathode layer, and a cathode collector (e.g., stainless steel foil or aluminum foil) all at the same time. In some cases, an NGP-containing resin was used as a binder, for instance, between a cathode layer and a cathode current collector. Filaments may also be bonded by an intrinsically conductive polymer as a binder to form a web. For instance, polyaniline-maleic acid-dodecyl hydrogensulfate salt may be synthesized directly via emulsion polymerization pathway using benzoyl peroxide oxidant, sodium dodecyl sulfate surfactant, and maleic acid as dopants. Dry polyaniline-based powder may be dissolved in DMF up to 2% w/v to form a solution.

The conventional cathode was prepared in the following way. As an example, 91% by weight of lithium cobalt oxide powder $LiCoO_2$, 3.5% by weight of acetylene black, 3.5% by weight of graphite, and 2% by weight of ethylene-propylene-diene monomer powder were mixed together with toluene to obtain a mixture. The mixture was then coated on an aluminum foil (30 μm) serving as a current collector. The resulting two-layer aluminum foil-active material configuration was then hot-pressed to obtain a positive electrode. In several examples, the same or similar integrated 3-D structure of conductive nano-filaments used in the anode was used to support the cathode active material as well.

In the preparation of a cylindrical cell, a positive electrode, a separator composed of a porous polyethylene film, and a negative electrode was stacked in this order. The stacked body was spirally wound with a separator layer being disposed at the outermost side to obtain an electrode assembly as schematically shown in FIG. 1.

The following examples are presented primarily for the purpose of illustrating the best mode practice of the present invention, not to be construed as limiting the scope of the present invention.

Example 1

Conductive Web of Filaments from Electro-spun PAA Fibrils

Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus schematically shown in FIG. 4. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain Sample c-PI-0 with an average fibril diameter of 67 nm. Such a web can be used to accommodate lithium coatings (during re-charge) for the anode and/or as a conductive substrate for a cathode active material.

Example 2

Conductive Web of Filaments from Electro-spun PAN Fibrils and NGP-containing PAN Fibrils Suspension solutions were obtained by first preparing two solutions (A=solvent+NGPs and B=solvent+polymer) and then mixing the two solutions together to obtain the suspension solution. In the case of NGP-PAN fibril, the solvent used was N,N,-dimethyl formamide (DMF). For the preparation of Suspension A, the NGPs were added to a solvent and the resulting suspensions were sonicated to promote dispersion of separate NGPs in the solvent with a sonication time of 20 minutes. Suspension solution B was obtained by dissolving the polymer in the solvent with the assistance of heat (80° C. for DMF+PAN) and stirring action using a magnetic stirrer typically for 90 and 30 minutes, respectively. Suspensions A and B were then mixed together and further sonicated for 20 minutes to help maintain a good dispersion of NGPs in the polymer-solvent solution. An electrostatic potential of 10 kV was applied over a distance of 10 cm between the syringe needle tip and a 10 cm×10 cm porous aluminum plate that was grounded.

A range of NGP-polymer proportions in the original suspension solution were prepared (based on (NGP wt.)/(NGP wt.+polymer weight)): 0%, 5%, and 10% for PAN compositions. The resulting nanocomposite fibrils, after the solvent was completely removed, had comparable NGP-polymer ratios as the original ratios. They are designated as Samples PAN-0, PAN-5, and PAN-10, respectively. The average diameters of these fibrils were approximately 75 nm.

The NGP-PAN nanocomposite fibrils were converted to carbon/carbon nanocomposite by heat-treating the fibrils first at 200° C. in an oxidizing environment (laboratory air) for 45 minutes and then at 1,000° C. in an inert atmosphere for 2 hours. The resulting carbonized samples are referred to as Samples c-PAN-5 and c-PAN-10, respectively. NGP-free PAN fibrils were also carbonized under comparable conditions to obtain Sample c-PAN-0. Their diameters became approximately 55 nm. Such a web can be used to support re-deposited lithium coating at the anode (during re-charge) and/or as a conductive substrate for a cathode active material.

Example 3

Preparation of NGP-Based Webs (Aggregates of NGPs and NGPs+CNFs)

Continuous graphite fiber yarns (Magnamite AS-4 from Hercules) were heated at 800° C. in a nitrogen atmosphere for 5 hours to remove the surface sizing. The yarns were cut into segments of 5 mm long and then ball-milled for 24 hours. The intercalation chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite fibers (20 g) were added under vigorous stirring to avoid agglomeration. After the graphite fiber segments were well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite fiber sample. The dried, expandable graphite fiber sample was quickly placed in a tube furnace preheated to 1,000° C. and allowed to stay inside a quartz tube for approximately 40 seconds to obtain exfoliated graphite worms. The worms were dispersed in water to form a suspension, which was ultrasonicated with a power of 60 watts for 15 minutes to obtain separated NGPs. Approximately half of the NGP-containing suspension was filtered and dried to obtain several paper-like mats, referred to as Sample NGP-100. Vapor grown CNFs were then added to the remaining half to form a suspension containing both NGPs and CNFs (20%), which was dried and made into several paper-like mats (Sample NGP-CNF-20). Approximately 5% phenolic resin binder was used to help consolidate the web structures in both samples. Such a web can be used to support Li coatings for the anode and/or as a conductive substrate for a cathode active material.

Example 4

Preparation of Conductive Webs from CNTs and Vapor-Grown CNFs

Commercially available CNTs (Cheap Tubes, LLC) and vapor-grown CNFs (Applied Science, Inc., Cedarville, Ohio) were separately made into conductive webs using a conventional paper-making procedure. Basically, a slurry of CNTs or CNFs, plus stabilized lithium particles, was poured over a top surface of a Teflon-based membrane with sub-micron pores. Water permeates through the membrane pores with the assistance of a suction force created by a vacuum pump-generated pressure differential between the top surface and the bottom surface of the membrane. Solid ingredients (CNTs or CNFs) stay on the top surface of the membrane, which may be separated from the membrane and dried to become a sheet of porous paper or mat (Sample CNT and Sample CNF).

Comparative Example 5

Solid State Cell with Lithium Foil as an Anode (No Nano-structure of Conductive Nano-filaments) and Dried Sulfur Paste as Cathode A cathode film was made by mixing 50% by weight of elemental sulfur, 13% carbon black, polyethylene oxide (PEO), and lithium trifluoromethanesulfonimide (wherein the concentration of the electrolyte salt to PEO monomer units ($CH_2CH_2O$) per molecule of salt was 49:1], and 5% 2,5-dimercapto-1,3,4-dithiadiazole in a solution of acetonitrile (the solvent to PEO ratio being 60:1 by weight). The components were stir-mixed for approximately two days until the slurry was well mixed and uniform. A thin cathode film was cast directly onto stainless steel current collectors, and the solvent was allowed to evaporate at ambient temperatures. The resulting cathode film weighed approximately 0.0030-0.0058 gm/cm$^2$.

The polymeric electrolyte separator was made by mixing PEO with lithium trifluoromethanesulfonimide, (the concentration of the electrolyte salt to PEO monomer units ($CH_2CH_2O$) per molecule of salt being 39:1) in a solution of acetonitrile (the solvent to polyethylene oxide ratio being 15:1 by weight). The components were stir-mixed for two hours until the solution was uniform. Measured amounts of the separator slurry were cast into a retainer onto a release film, and the solvent was allowed to evaporate at ambient temperatures. The resulting electrolyte separator film weighed approximately 0.0146-0.032 gm/cm$^2$.

The cathode film and polymeric electrolyte separator were assembled under ambient conditions, and then vacuum dried overnight to remove moisture prior to being transferred into the argon glovebox for final cell assembly with a 3 mil (75 micron) thick lithium anode foil. The anode current collector was Cu foil. Once assembled, the cell was compressed at 3 psi and heated at 40° C. for approximately 6 hours to obtain an integral cell structure.

Example 5

Solid State Cell with a Li Foil and a Supporting Nano-filament Web as an Anode and Dried Sulfur Paste as a Cathode A lithium metal cell containing an identical cathode and similar electrolyte composition as in Comparative Example 5 was fabricated, but the anode was a nano-structured web prepared in Example 4. Several cells with varying proportions of nanostructure relative to lithium foil weight, were fabricated and tested.

Example 6

Physical Vapor Deposition of Sulfur on Conductive Webs for Cathodes

Sublimation of solid sulfur occurs at a temperature greater than 20° C., but a significant sublimation rate typically does not occur until the temperature is above 40° C. In a typical procedure, a nano-filament web is sealed in a glass tube with the solid sulfur positioned at one end of the tube and the web near another end at a temperature of 40-75° C. The sulfur vapor exposure time was typically from several minutes to several hours for a sulfur coating of several nanometers to several microns in thickness. A sulfur coating thickness lower than 500 nm is preferred, but most preferred is a thickness lower than 100 nm Several lithium metal cells with similar configuration and compositions as in Example 5 were fabricated, but the cathode used was prepared through vapor deposition of sulfur instead.

Example 7

Non-aqueous Liquid Electrolyte Cells with a Lithium Foil and Nano-filament Web as an Anode and Cobalt Oxide as a Cathode Active Material Lithium metal cells were prepared following a procedure similar to Example 5, but the cathode active material was lithium cobalt oxide. The cathode was prepared by mixing cobalt oxide particles, 10% carbon black, 5% PVDF in DMF to form a slurry, which was coated to a stainless steel foil and dried. For the preparation of electrolyte, hexafluorolithium phosphate ($LiPF_6$) was dissolved in a mixed solvent consisting of ethylene carbonate (EC) and methylethyl carbonate (MEC) (volume ratio: 50:50) to obtain a non-aqueous electrolyte, the concentration of $LiPF_6$ being 1.0 mol/l (solvent). The electrode assembly and the non-aqueous electrolyte were placed in a bottomed cylindrical case made of stainless steel, thereby obtaining a cylindrical lithium secondary battery.

Comparative Example 7

Solid State Cells with a Lithium Foil Anode (No Nanostructure of Filaments) and Cobalt Oxide as a Cathode Active Material Similar lithium metal cells as in Example 7 were fabricated, but the anode used was lithium foil only.

Example 8

Evaluation of Electrochemical Performance of Various Cells

Charge capacities were measured periodically and recorded as a function of the number of cycles. The discharge capacity herein referred to is the total charge inserted into the cathode during the first discharge, per unit mass of the cell (counting both electrode active materials, conductive additives, nano-filaments, binder, and any other additive, if existing). The charge capacity refers to the amount of charge per unit mass of the cell, corresponding to the amount of lithium plated back to the surface of the nano-structured web and the anode current collector. The morphological or micro-structural changes of selected samples after a desired number of repeated charging and recharging cycles were observed using both transmission electron microscopy (TEM) and scanning electron microscopy (SEM).

Shown in FIG. 7 are two cell specific capacity series, one for a Li—S cell featuring a nano-structured anode containing approximately 70% by weight lithium foil and 30% by weight nano-filaments, and a cathode containing 36% active sulfur prepared in Example 5 and the other for a Li—S cell featuring a lithium foil anode and a cathode containing 36% active sulfur prepared in Comparative Example 5. It was quite striking that the cell with a Li foil (without a nano-structured support) failed after 45 cycles while the corresponding cell with a nano-structured anode exhibits very little decay in capacity even after 150 cycles. Scanning electron microscopic examinations of the two cells and several other cells, after testing was stopped, indicated that very uniform lithium coating was formed on the surface of nano-filaments at the cell charged state for those cells featuring the presently invented nano-structured anode. No dendrite or even non-uniformity of lithium layer was observed. In contrast, the cell containing a Li foil only as the anode tended to form some gaps between the current collector (Cu foil) and the lithium layer upon re-deposition (after re-charging), and many non-uniformities and some dendrite-type features were commonly observed. Not wishing to be bound by any theory, but the applicants feel that the uniformly disposed, conductive nano-filaments appear to provide a locally uniform electric field at the anode side that serves to attract lithium ions in a uniform manner, enabling homogeneous deposition of lithium onto the nano-filament surface. Uniform deposition of lithium on a substrate also implies the prevention of non-uniformities, such as dendrites, from developing.

FIG. 8 shows similar trends for secondary cells featuring cobalt oxide as a cathode active material. Again, the nano-structured anode of the instant invention provides a superior lithium metal secondary cell with a more stable and longer cycle life.

FIG. 9 shows the cell specific capacity behaviors of two comparable Li—S cells (both with 70% active Li foil at the anode and 54% active sulfur at the cathode). One cell features a cathode prepared by physical vapor deposition of sulfur on the filament surface of a nano-structured cathode (top curve, one of the cells fabricated in Example 6). The other cell features a cathode prepared by mixing elemental sulfur with carbon black and other additives, followed by coating the resulting paste on a stainless steel current collector (lower curve, cathode active material fabricated in a manner similar to that in Comparative Example 5). Both cells make use of a nano-structured anode as instantly invented. Surprisingly, the cell with vapor deposited sulfur coating on the filament surface of a nano-structured cathode shows a very stable cycling behavior with very little capacity fade after 200 charge-discharge cycles. In contrast, the cell without a nano-structured cathode gradually decays in capacity. It seems that some of the sulfur particles at the cathode gradually lost contact with the carbon black or, indirectly, with the current collector and, hence, they no longer were effective in serving as a cathode active material.

Example 9

Lithium-Air Secondary Cells

Four lithium-air cells were fabricated: Cell A=cell with a nano-structured anode containing a Li foil and a nano-structured cathode (an integrated 3-D mat of nano-filaments, also serving as a current collector); Cell B=cell with a lithium foil anode (no mat of nano-filaments at the anode) and a nano-structured cathode (an integrated 3-D mat of nano-filaments, also serving as a current collector); Cell C=cell with a Li foil anode and a graphite powder-Ni screen cathode structure (also serving as a current collector); and Cell D=cell with a nano-structured anode containing a Li foil and a graphite powder-Ni screen cathode structure.

Cell C was a Li/PAN-based polymer electrolyte/oxygen cell, which was prepared by sandwiching a polymer electrolyte film (having a thickness of 4 mil) between a Li foil (having a thickness of 2 mil) and a graphite composite electrode (having a thickness of 6.7 mil).

For Cell C, the preparation of the polymer electrolyte film was carried out by heating a 12:40:40:8 ratio by weight mixture of PAN, EC, PC and $LiPF_6$ at 135° C. until a homogeneous solution was formed. The solution was then poured between two stainless-steel shims coated with Teflon films, and passed between two rollers. On cooling, dimensionally stable polymer electrolyte films were formed. The graphite composite electrode current collector was prepared from a 40:60 by weight-percent mixture of a natural graphite powder with 10 μm average particle size and the polymer electrolyte by depositing it on a Ni screen.

Cell B was prepared in a similar manner than Cell C, but the air cathode was an integrated structure of nano-filaments (prepared in Example 4). Cell A was similar to Cell B, but the anode was a nano-structured composition containing 70% by weight of lithium foil. Cell D was similar to Cell A, but the cathode was a graphite powder/Ni screen composite structure.

In all three cells, a cobalt phthalocyanine catalyst was coated on the carbon nano-fibers or graphite particles of the air cathode. The catalyst was used to promote/accelerate the reduction of lithium oxide (the discharge product) back to lithium ions and oxygen when the cells were recharged. Each cell package was enclosed in a D-cell can and an atmosphere of oxygen gas was maintained inside the can. The cell showed an open circuit voltage (OCV) of 2.52 V, 2.69V, and 2.69V, and 2.52 V for Cell A, Cell B, Cell C, and Cell D, respectively. Typically, the cell was discharged and charged at room temperature at 0.1 mA/cm².

FIG. 10 shows the cell specific capacity responses of the four Li-air cells. The data clearly indicated that the cell with a nano-structured anode and a nano-structure air cathode (Cell A) exhibits the most impressive cycling stability. The starting specific capacity of Cell A was lower than that of Cell B and that of Cell C due to the notion that there was approximately 30% carbon nano-fibers (only 70% lithium foil) in the anode of Cell A, but there was 100% Li in the anode of both Cell B and Cell C. However, as cycling proceeds, Cell A maintains a very stable reversible capacity. Both Cell B and Cell C failed after 25 cycles due to the formation of dendrites and detachment of lithium layer from the anode current collector. Cell B also exhibits a rapidly decaying capacity. This decay might be due to the possibility that the cathode reaction was limited by the rapidly diminishing porosity (restricting oxygen accessibility) and loss of contact between lithium oxide particles and graphite particles (reducing the effective amount of lithium oxide available for chemical reduction during re-charging). This similar decaying trend was also observed for Cell D that features a graphite powder-Ni screen composite cathode. Due to the utilization of a nano-structured anode, there was no dendrite-related failure for a large number of cycles.

In summary, the present invention provides an innovative, versatile, and surprisingly effective platform materials technology that enables the design and manufacture of superior anode structures and cathode structures for lithium metal and lithium-air rechargeable batteries. There was no prior art work reported on the instant inventions. The instant inventions are not obvious extension of any prior art work and could not have been anticipated based on any prior art work.

The invention claimed is:

1. A lithium secondary battery selected from a lithium metal battery or lithium-air battery, comprising a cathode, an anode, and a separator-electrolyte assembly or electrolyte layer disposed between said cathode and said anode, wherein said anode of said lithium metal battery or lithium-air battery comprises an anode active material consisting of:
  a. an integrated nano-structure of electrically conductive nanometer-scaled filaments that are interconnected to form a porous network of electron-conducting paths comprising interconnected pores, wherein said filaments have a transverse dimension less than 500 nm and said filaments are electro-spun nano fibers, vapor-grown carbon or graphite nano fibers, carbon or graphite whiskers, carbon nano-tubes, nano-scaled graphene platelets, metal nano wires, or a combination thereof, and wherein lithium ions are deposited on surfaces of said filaments during a charge of said lithium metal battery or lithium-air battery, and lithium ions are released from said filament surfaces during a discharge of said lithium metal battery or lithium-air battery and these filaments prevent dendrite formation; and
  b. lithium or lithium alloy foil as an anode active material of said lithium metal battery or lithium-air battery.

2. The lithium secondary battery of claim 1 wherein said integrated nano-structure is disposed between said lithium or lithium alloy foil and said separator-electrolyte assembly or electrolyte layer.

3. The lithium secondary battery of claim 1 wherein said lithium or lithium alloy foil is disposed between said integrated nano-structure and said separator-electrolyte assembly or electrolyte layer.

4. The lithium secondary battery of claim 1 wherein said filaments have a transverse dimension smaller than 100 nm.

5. The lithium secondary battery of claim 1 wherein said filaments comprise a fiber selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof.

6. The lithium secondary battery of claim 1 wherein said filaments comprise nano-scaled graphene platelets with a thickness less than 10 nm.

7. The lithium secondary battery of claim 1 wherein said filaments comprise single-layer graphene.

8. The lithium secondary battery of claim 1 wherein said integrated structure comprises a gradient structure.

9. The lithium secondary battery of claim 1, wherein said nano-filaments are bonded by a binder material selected from a polymer, coal tar pitch, petroleum pitch, meso-phase pitch, coke, or a derivative thereof.

10. The lithium secondary battery according to claim 1, wherein said cathode comprises a cathode active material selected from the group consisting of lithium cobalt oxide, lithium nickel oxide, lithium manganese oxide, a non-lithiated oxide of a transition metal, lithium iron phosphate, lithium vanadium phosphate, lithium manganese phosphate, a non-lithiated transition metal phosphate, a chalcogen compound, and combinations thereof.

11. The lithium secondary battery according to claim 1, wherein said cathode comprises a non-lithiated cathode active material.

12. The lithium secondary battery according to claim 1, wherein said cathode comprises sulfur, sulfur-containing molecule, sulfur-containing compound, sulfur-carbon polymer, or a combination thereof.

13. The lithium secondary battery according to claim 1, wherein said cathode comprises (a) an integrated nano-structure of electrically conductive nanometer-scaled filaments that are interconnected to form a porous network of electron-conducting paths comprising pores, wherein said filaments have a transverse dimension less than 500 nm; and (b) a cathode active material bonded to or in physical contact with said integrated nano-structure.

14. The lithium secondary battery according to claim 13, wherein said cathode active material comprises sulfur, a sulfur-containing molecule, a sulfur-containing compound, a sulfur-carbon polymer, or a combination thereof.

15. The lithium secondary battery according to claim 13, wherein said cathode active material contains a coating bonded to at least one of said filaments.

16. The lithium secondary battery according to claim 1, wherein said electrolyte is selected from the group consisting of polymer electrolyte, polymer gel electrolyte, solid-state electrolyte, composite electrolyte, soft matter phase electrolyte, and combinations thereof.

17. The lithium secondary battery according to claim 1, wherein said electrolyte is selected from the group of solid-state electrolytes consisting of solid ionic conductors based on a $LiM_2(PO_4)_3$ structure, where M is a metal, lithium aluminum germanium phosphates represented by $Li_{1+x}Al_xGe_{2-x}PO_4)_3$, where x=0.1-0.9, glass-ceramic solid electrolytes, and combinations thereof.

18. The lithium secondary battery as defined in claim 1, wherein said battery provides a reversible specific capacity of no less than 500 mAh per gram of the total battery weight including anode, cathode, electrolyte, and separator components together.

19. The lithium secondary battery as defined in claim 1, wherein said battery provides a specific capacity of no less than 700 mAh per gram of the total battery weight including anode, cathode, electrolyte, and separator components together.

20. The lithium secondary battery of claim 1, which is a lithium-air battery and wherein said cathode is an air cathode.

21. The lithium-air battery of claim 20 wherein said filaments have a transverse dimension smaller than 100 nm.

22. The lithium-air battery of claim 20 wherein said filaments comprise an electrically conductive material selected from the group consisting of electro-spun nano fibers, vapor-grown carbon or graphite nano fibers, carbon or graphite whiskers, carbon nano-tubes, nano-scaled graphene platelets, metal nano wires, and combinations thereof.

23. The lithium-air battery of claim 20 wherein said filaments comprise a fiber selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof.

24. The lithium-air battery of claim 20 wherein said filaments comprise nano-scaled graphene platelets with a thickness less than 10 nm.

25. The lithium-air battery of claim 20 wherein said filaments comprise single-layer graphene.

26. The lithium-air battery of claim 20 wherein said integrated nano-structure comprises a gradient structure.

27. The lithium-air battery as defined in claim 20, wherein said nano-filaments are bonded by a binder material selected from a polymer, coal tar pitch, petroleum pitch, meso-phase pitch, coke, or a derivative thereof.

28. The lithium-air battery according to claim 20, wherein said air cathode comprises an integrated nano-structure of electrically conductive nanometer-scaled filaments that are interconnected to form a porous network of electron-conducting paths comprising interconnected pores, wherein said filaments in said air cathode have a transverse dimension less than 500 nm.

29. The lithium-air battery according to claim 28, wherein said air cathode further comprises a catalyst coated on a surface of said filaments and said catalyst serves to catalyze a cathode reaction of reducing lithium oxide to lithium ions and oxygen during a battery re-charging operation.

30. The lithium-air battery according to claim 20, wherein said electrolyte is selected from the group of solid-state electrolytes consisting of solid ionic conductors based on a $LiM_2(PO_4)_3$ structure, where M is a metal, lithium aluminum germanium phosphates represented by $Li_{1+x}Al_xGe_{2-x}(PO_4)_3$, where x=0.1-0.9, glass-ceramic solid electrolytes, and combinations thereof.

31. The lithium-air battery according to claim 29, wherein said electrolyte is selected from the group of solid-state electrolytes consisting of solid ionic conductors based on a $LiM_2(PO_4)_3$ structure, where M is a metal, lithium aluminum germanium phosphates represented by $Li_{1+x}Al_xGe_{2-x}(PO_4)_3$, where x=0.1-0.9, glass-ceramic solid electrolytes, and combinations thereof.

* * * * *